US011797301B2

(12) United States Patent
Boswell et al.

(10) Patent No.: US 11,797,301 B2
(45) Date of Patent: *Oct. 24, 2023

(54) GENERALIZED ACCELERATION OF MATRIX MULTIPLY ACCUMULATE OPERATIONS

(71) Applicant: NVIDIA Corporation, Santa Clara, CA (US)

(72) Inventors: Brent Ralph Boswell, Aloha, OR (US); Ming Y. Siu, Santa Clara, CA (US); Jack H. Choquette, Palo Alto, CA (US); Jonah M. Alben, San Jose, CA (US); Stuart Oberman, Sunnyvale, CA (US)

(73) Assignee: NVIDIA Corporation, Santa Clara, CA (US)

(*) Notice: Subject to any disclaimer, the term of this patent is extended or adjusted under 35 U.S.C. 154(b) by 36 days.

This patent is subject to a terminal disclaimer.

(21) Appl. No.: 17/141,082

(22) Filed: Jan. 4, 2021

(65) Prior Publication Data

US 2021/0303302 A1 Sep. 30, 2021

Related U.S. Application Data

(63) Continuation of application No. 16/459,191, filed on Jul. 1, 2019, now Pat. No. 10,884,734, which is a
(Continued)

(51) Int. Cl.
*G06F 9/30* (2018.01)
*G06T 1/20* (2006.01)
*G06F 9/38* (2018.01)

(52) U.S. Cl.
CPC ........ *G06F 9/30014* (2013.01); *G06F 9/3001* (2013.01); *G06F 9/3012* (2013.01);
(Continued)

(58) Field of Classification Search
CPC ...... G06F 9/30014; G06F 7/50; G06F 7/5235; G06F 7/575; G06F 7/16; G06T 1/20
(Continued)

(56) References Cited

U.S. PATENT DOCUMENTS 5,014,235 A 5/1991 Morton
5,226,171 A 7/1993 Hall et al.
(Continued)

FOREIGN PATENT DOCUMENTS

CN 1707426 A 12/2005
CN 101802779 A 8/2010
(Continued)

OTHER PUBLICATIONS

IEEE, "IEEE Standard 754-2008 (Revision of IEEE Standard 754-1985): IEEE Standard for Floating-Point Arithmetic," Aug. 29, 2008, 70 pages.
(Continued)

*Primary Examiner* — Tan V Mai
(74) *Attorney, Agent, or Firm* — Davis Wright Tremaine LLP

(57) ABSTRACT

A method, computer readable medium, and processor are disclosed for performing matrix multiply and accumulate (MMA) operations. The processor includes a datapath configured to execute the MMA operation to generate a plurality of elements of a result matrix at an output of the datapath. Each element of the result matrix is generated by calculating at least one dot product of corresponding pairs of vectors associated with matrix operands specified in an instruction for the MMA operation. A dot product operation includes the steps of: generating a plurality of partial products by multiplying each element of a first vector with a corresponding element of a second vector; aligning the plurality of partial products based on the exponents associated with each ele-
(Continued)

ment of the first vector and each element of the second vector; and accumulating the plurality of aligned partial products into a result queue utilizing at least one adder.

20 Claims, 16 Drawing Sheets

Related U.S. Application Data continuation of application No. 15/826,435, filed on Nov. 29, 2017, now Pat. No. 10,338,919.

(60) Provisional application No. 62/503,159, filed on May 8, 2017.

(52) U.S. Cl.
CPC ........ *G06F 9/30036* (2013.01); *G06F 9/3851* (2013.01); *G06T 1/20* (2013.01)

(58) Field of Classification Search
USPC .......................................... 708/607; 712/222
See application file for complete search history.

(56) References Cited

U.S. PATENT DOCUMENTS

| | | | |
|---|---|---|---|
| 5,491,650 | A | 2/1996 | Barhen et al. |
| 7,337,205 | B2 | 2/2008 | Sazegari |
| 8,051,124 | B2 | 11/2011 | Salama et al. |
| 8,165,214 | B2 | 4/2012 | Iliev |
| 8,626,815 | B1 | 1/2014 | Langhammer |
| 8,924,455 | B1 | 12/2014 | Barman et al. |
| 8,984,043 | B2 | 3/2015 | Ginzburg et al. |
| 9,201,828 | B2 | 12/2015 | Sanghai et al. |
| 10,324,689 | B2 | 6/2019 | Kalsi et al. |
| 10,338,919 | B2 | 7/2019 | Boswell et al. |
| 10,372,416 | B2 | 8/2019 | Fais et al. |
| 2003/0110197 | A1 | 6/2003 | Hansen et al. |
| 2007/0271325 | A1 | 11/2007 | Juffa et al. |
| 2008/0183792 | A1 | 7/2008 | Inoue |
| 2008/0291198 | A1 | 11/2008 | Chun et al. |
| 2010/0191939 | A1 | 7/2010 | Muff et al. |
| 2011/0040821 | A1 | 2/2011 | Eichenberger et al. |
| 2012/0113133 | A1 | 5/2012 | Shpigelblat |
| 2014/0365548 | A1 | 12/2014 | Mortensen |
| 2021/0182058 | A1 | 6/2021 | Kaul et al. |

FOREIGN PATENT DOCUMENTS

| | | |
|---|---|---|
| CN | 102411558 A | 4/2012 |
| CN | 103927290 A | 7/2014 |
| CN | 102750150 B | 5/2015 |
| CN | 104617959 A | 5/2015 |
| CN | 103294648 B | 6/2016 |
| CN | 105849690 A | 8/2016 |
| CN | 107533667 A | 1/2018 |
| EP | 2067100 A2 | 6/2009 |
| TW | 201635143 A | 10/2016 |
| TW | 201703046 A | 1/2017 |

OTHER PUBLICATIONS

Lei et al., "FPGA implementation of an exact dot product and its application in variable-precision floating-point arithmetic," The Journal of Supercomputing, vol. 64, No. 2, Jan. 23, 2013, pp. 580-605.
Ye, Z., "GPU Assignment 5KK70: MatrixMul Example," Nov. 5, 2009, pp. 1-11, as retrieved from https://sites.google.com/site/5kk70gpu/matrixmul-example.
Society of Automotive Engineers On-Road Automated Vehicle Standards Committee, "Taxonomy and Definitions for Terms Related to Driving Automation Systems for On-Road Motor Vehicles," Standard No. J3016-201609, issued Jan. 2014, revised Sep. 2016, 30 pages.
Society of Automotive Engineers On-Road Automated Vehicle Standards Committee, "Taxonomy and Definitions for Terms Related to Driving Automation Systems for On-Road Motor Vehicles," Standard No. J3016-201806, issued Jan. 2014, revised Jun. 2018, 35 pages.
Wikipedia, "IEEE 802.11," Wikipedia the Free Encyclopedia, https://en.wikipedia.org/wiki/IEEE_802.11, most recent edit Sep. 20, 2020 [retrieved Sep. 22, 2020], 15 pages.
Chinese Office Action for Appplication No. 201810425869.9 dated Oct. 11, 2021, 11 pages.
Intel, "Architecture Instruction Set Extensions and Future Features Programming Reference," Feb. 2021, 211 pages.

*Fig. 7*

GENERALIZED ACCELERATION OF MATRIX MULTIPLY ACCUMULATE OPERATIONS

CROSS-REFERENCE TO RELATED APPLICATIONS

This application is a continuation of U.S. patent application Ser. No. 16/459,191 filed Jul. 1, 2019, entitled "GENERALIZED ACCELERATION OF MATRIX MULTIPLY ACCUMULATE OPERATIONS," which is a continuation of U.S. application Ser. No. 15/826,435 filed Nov. 29, 2017, entitled "GENERALIZED ACCELERATION OF MATRIX MULTIPLY ACCUMULATE OPERATIONS," which claims the benefit of U.S. Provisional Application No. 62/503,159, filed May 8, 2017, entitled "GENERALIZED ACCELERATION OF MATRIX MULTIPLY ACCUMULATE OPERATIONS," the disclosures of which are incorporated by reference herein in their entirety.

FIELD OF THE INVENTION

The present disclosure relates to implementing arithmetic operations on a processor, and more particularly to acceleration of a matrix multiply accumulate operation.

BACKGROUND

Modern computer processors are fundamentally integrated circuits designed to complete a logical task. One task that processors are really good at implementing is performing arithmetic operations on numbers encoded in different formats (e.g., 8-bit integers, 32-bit integers, 32-bit floating-point values, etc.). However, most processors include logic for performing these arithmetic operations on scalar operands. For example, logic designed to perform an addition operation is designed to perform the operation using two distinct operands, each operand encoding a particular value to sum with the other operand. However, arithmetic operations are not limited to scalar values. In fact, many applications may utilize arithmetic operations on vector or matrix inputs. One example of an arithmetic operation on vectors is the dot product operation. While calculating dot products is common in these applications (e.g., physics), modern processors typically do not have the hardware designed into the circuit to perform these operations efficiently. Instead, the higher-level operation is reduced into a series of basic arithmetic operations using scalar values. For example, in the dot product operation, each vector operand includes a plurality of elements, and the dot product operation is performed by multiplying corresponding pairs of elements of the two input vectors to generate a plurality of partial products (i.e., intermediate results) and then summing the plurality of partial products. Each basic arithmetic operation can be performed in order using the hardware logic designed into the processor, and the intermediate results can be stored in a temporary memory store and re-used as the operand of another subsequent arithmetic operation.

Conventional processors include one or more cores, where each core may include an arithmetic logic unit (ALU) and/or a floating point unit for performing basic operations on integers and/or floating point values. Conventional floating-point units may be designed to implement a fused multiply accumulate (FMA) operation that multiplies two scalar operands and adds the intermediate result, along with an optional third scalar operand, to an accumulation register. A matrix multiply and accumulate (MMA) operation is the extension of the FMA operation for scalar values as applied to matrix operands. In other words, the MMA operation multiplies two matrices together and, optionally, adds the resulting intermediate matrix to a third matrix operand. Fundamentally, an MMA operation can be reduced into a number of basic dot product operations summed into an accumulation register. Furthermore, a dot product operation can be further reduced into a series of FMA operations on pairs of scalar operands.

Conventional processors can implement matrix operations by breaking down the MMA operation into a series of dot product operations and addition operations, and each dot product operation can be further broken down into a series of FMA instructions on corresponding elements of a pair of vectors. However, this technique is not very efficient as the MMA operation must be broken down into each of the basic arithmetic operations using scalar operands. Each basic arithmetic operation executed by the logic of the processor involves moving the scalar operands between the register file of the processor and the inputs to a datapath (i.e., the logic circuitry). However, the basic fundamental concept of the matrix operation is that the same elements of the matrix are re-used in multiple dot product operations (e.g., the same row of a first matrix is used to generate multiple dot products corresponding with multiple columns of a second matrix). If each basic arithmetic operation requires data to be loaded from the register file to the input of the datapath before the arithmetic operation is executed, then each element of data of the input operands may be loaded from the register file to the datapath many numbers of times, which is an inefficient use of the register file bandwidth. While there may be techniques to improving the efficiency of the processor (e.g., having register files with multiple banks such that operands can be efficiently stored in separate banks and multiple operands can be loaded from the register file into the inputs of the datapath in a single clock cycle), typically, a datapath is not designed specifically with matrix operations in mind. Thus, there is a need for addressing these issues and/or other issues associated with the prior art.

SUMMARY

A method, computer readable medium, and processor are disclosed for performing matrix multiply and accumulate (MMA) operations. The processor includes a datapath configured to execute the MMA operation to generate a plurality of elements of a result matrix at an output of the datapath. Each element of the result matrix is generated by calculating at least one dot product of corresponding pairs of vectors associated with matrix operands specified in an instruction for the MMA operation. A dot product operation includes the steps of: generating a plurality of partial products by multiplying each element of a first vector with a corresponding element of a second vector; aligning the plurality of partial products based on the exponents associated with each element of the first vector and each element of the second vector; and accumulating the plurality of aligned partial products into a result queue utilizing at least one adder.

BRIEF DESCRIPTION OF THE DRAWINGS

FIG. 7 illustrates a matrix multiply accumulate operation, in accordance with one embodiment;

DETAILED DESCRIPTION

Many modern applications could benefit from more efficient processing of matrix operations by a processor. Arithmetic operations performed on matrix operands are commonly utilized by a variety of algorithms including, but not limited to: deep learning algorithms, linear algebra, and graphics acceleration, among others. Further efficiencies can be gained by using parallel processing units because the matrix operations can be reduced into a number of parallel operations on different portions of the matrix operands.

A new paradigm for datapath design is explored herein in order to accelerate matrix operations as executed by a processor. The fundamental concept of the datapath is that the datapath executes one or more dot product operations on a plurality of vector operands. The matrix operation can then be accelerated by reducing the matrix operation into a plurality of dot product operations, and some of the dot product operations can benefit from the sharing of data within a datapath that reduces the bandwidth between the register file and the inputs of the datapath.

Figure 1:
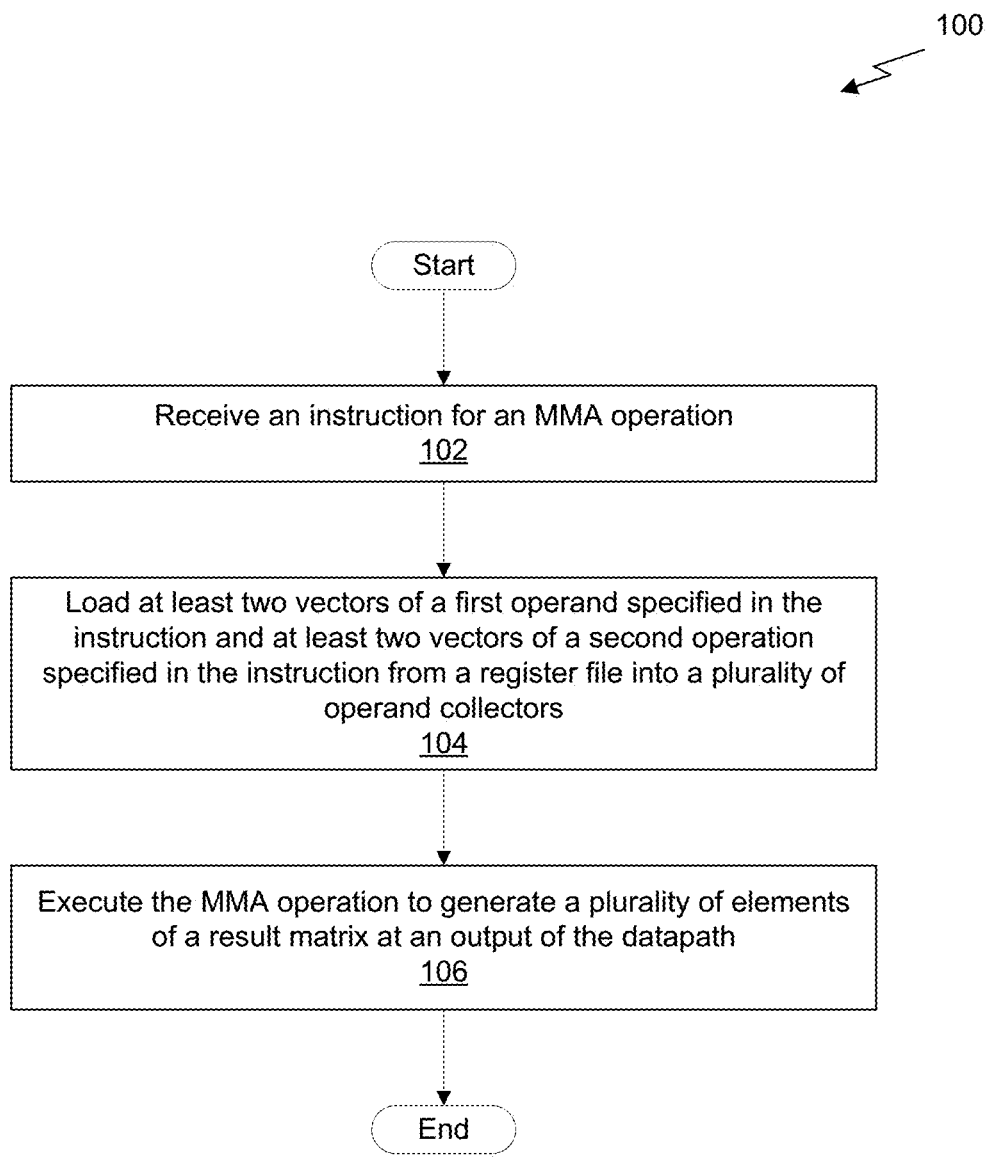
FIG. 1 illustrates a flowchart of a method for performing a matrix multiply and accumulate operation, in accordance with one embodiment.

FIG. 1 illustrates a flowchart of a method 100 for performing a matrix multiply and accumulate operation, in accordance with one embodiment. It will be appreciated that the method 100 is described within the scope of software executed by a processor; however, in some embodiments, the method 100 may be implemented in hardware or some combination of hardware and software. The method 100 begins at step 102, where an instruction for a matrix multiply and accumulate (MMA) operation is received. In one embodiment, the instruction for the MMA operation specifies a plurality of matrix operands. A first operand specifies a multiplicand input matrix A, a second operand specifies a multiplier input matrix B, and a third operand specifies a collector matrix C that is used to accumulate the results of the multiplication of the first two input matrices. Each operand specified in the instruction is a matrix having a plurality of elements in a two dimensional array of rows and columns.

At step 104, at least two vectors of a first operand specified in the instruction and at least two vectors of a second operand specified in the instruction are loaded from a register file into a plurality of operand collectors. In one embodiment, an operand collector is a plurality of flip-flops that are coupled to an input of a datapath configured to execute the MMA operation. The plurality of flip-flops temporarily store data for the operands of the MMA instruction at the inputs of the datapath such that multiple operands can be loaded from the register file to the inputs of the datapath over a number of clock cycles. Typically, the register file has a limited amount of bandwidth on one or more read ports such that only a limited amount of data can be read from the register file in a given clock cycle. Consequently, the operand collectors enable all of the operands required by the datapath to be read from the data file over multiple clock cycles prior to launching the execution of the MMA operation on the datapath.

At step 106, the MMA operation is executed to generate a plurality of elements of a result matrix at an output of the datapath. In one embodiment, each element of the result matrix is generated by calculating at least one dot product of corresponding pairs of vectors stored in the plurality of operand collectors. The datapath may be designed to generate multiple elements of the result matrix in multiple passes of the datapath, consuming different combinations of vectors stored in the operand collectors during each pass. Alternatively, the datapath may be designed to generate multiple elements of the result matrix in a single pass of the datapath, utilizing distinct sets of logic to calculate multiple dot products in parallel. Of course, in some embodiments, multiple sets of logic to calculate multiple dot products in parallel and multiple passes of the datapath may be utilized in order to generate even more elements of the result matrix in a single instruction cycle. It will be appreciated that the plurality of elements of the result matrix are generated without needing to load new operand data from the register file into the operand collectors in a subsequent pass or instruction cycle. Furthermore, it will be appreciated that each vector of the input matrix operands (i.e., A and B) stored in the operand collectors may be consumed by a plurality of dot product operations that contribute to multiple elements of the result matrix.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
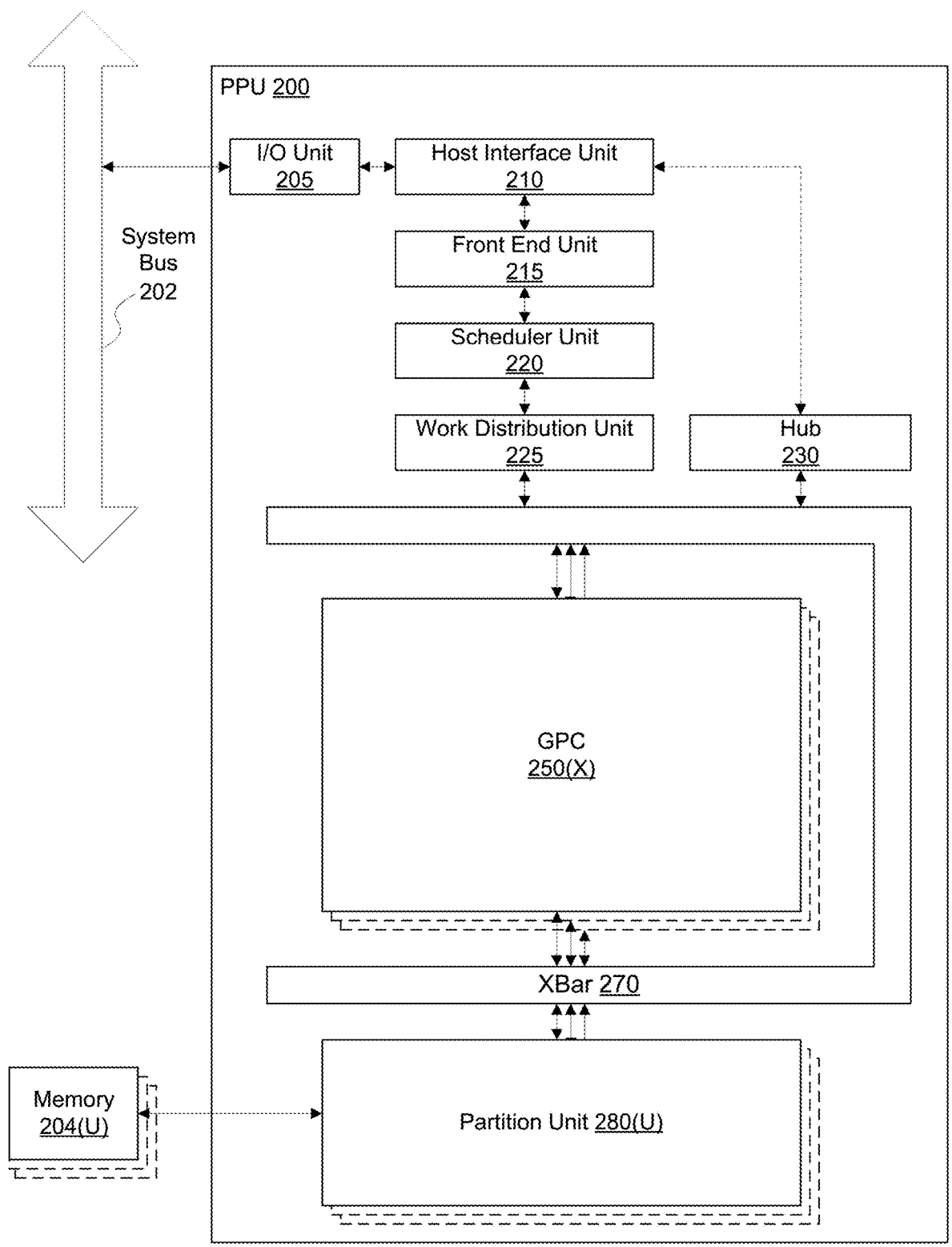
FIG. 2 illustrates a parallel processing unit (PPU), in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
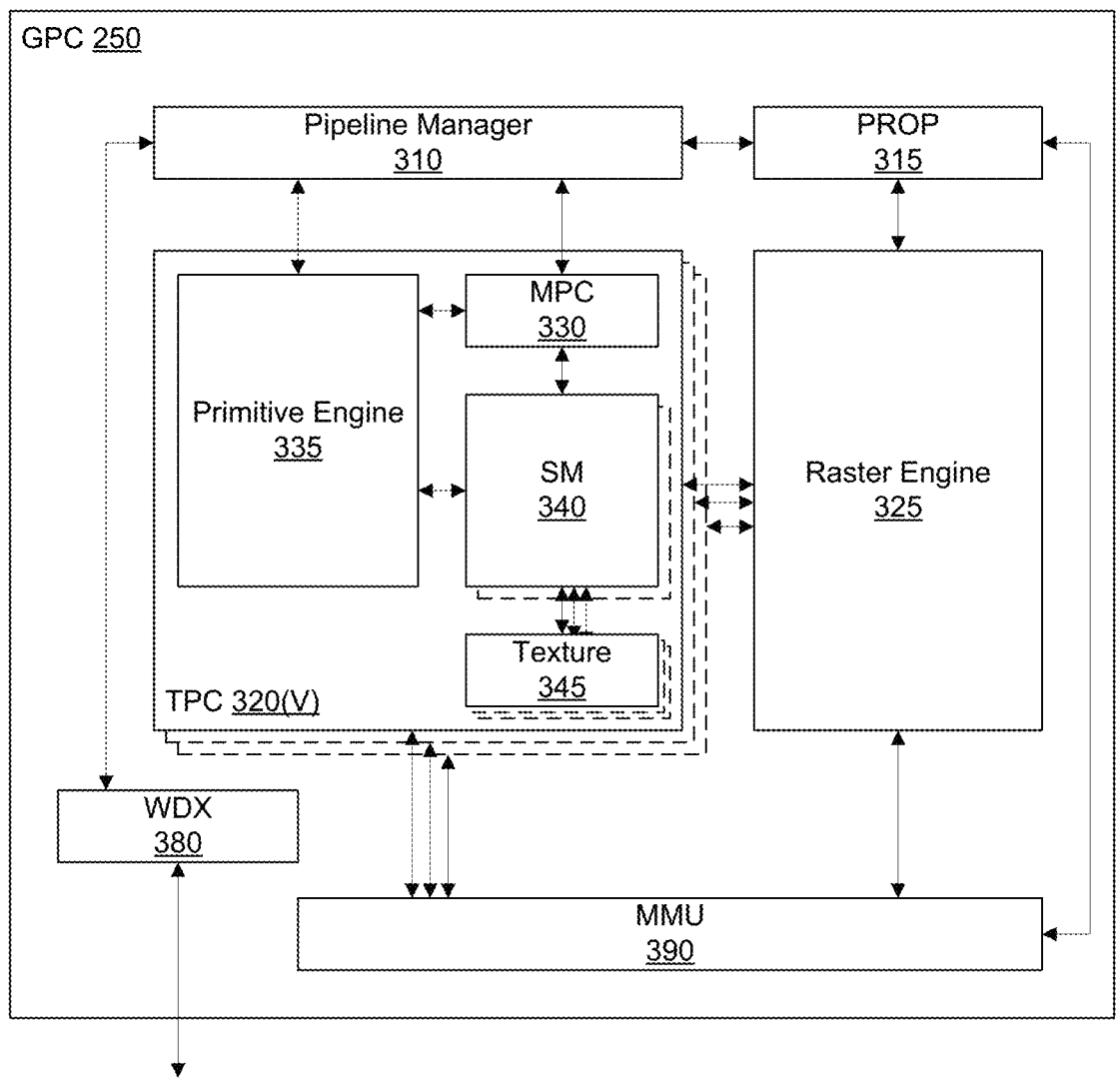
FIG. 3A illustrates a general processing cluster of the PPU of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 325 comprises fragments to be processed, for example, by a fragment shader implemented within a TPC 320.

Each TPC 320 included in the GPC 250 includes an M-Pipe Controller (MPC) 330, a primitive engine 335, one or more SMs 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). The texture unit 345 is also used as the Load/Store path for SM 340 to MMU 390. In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
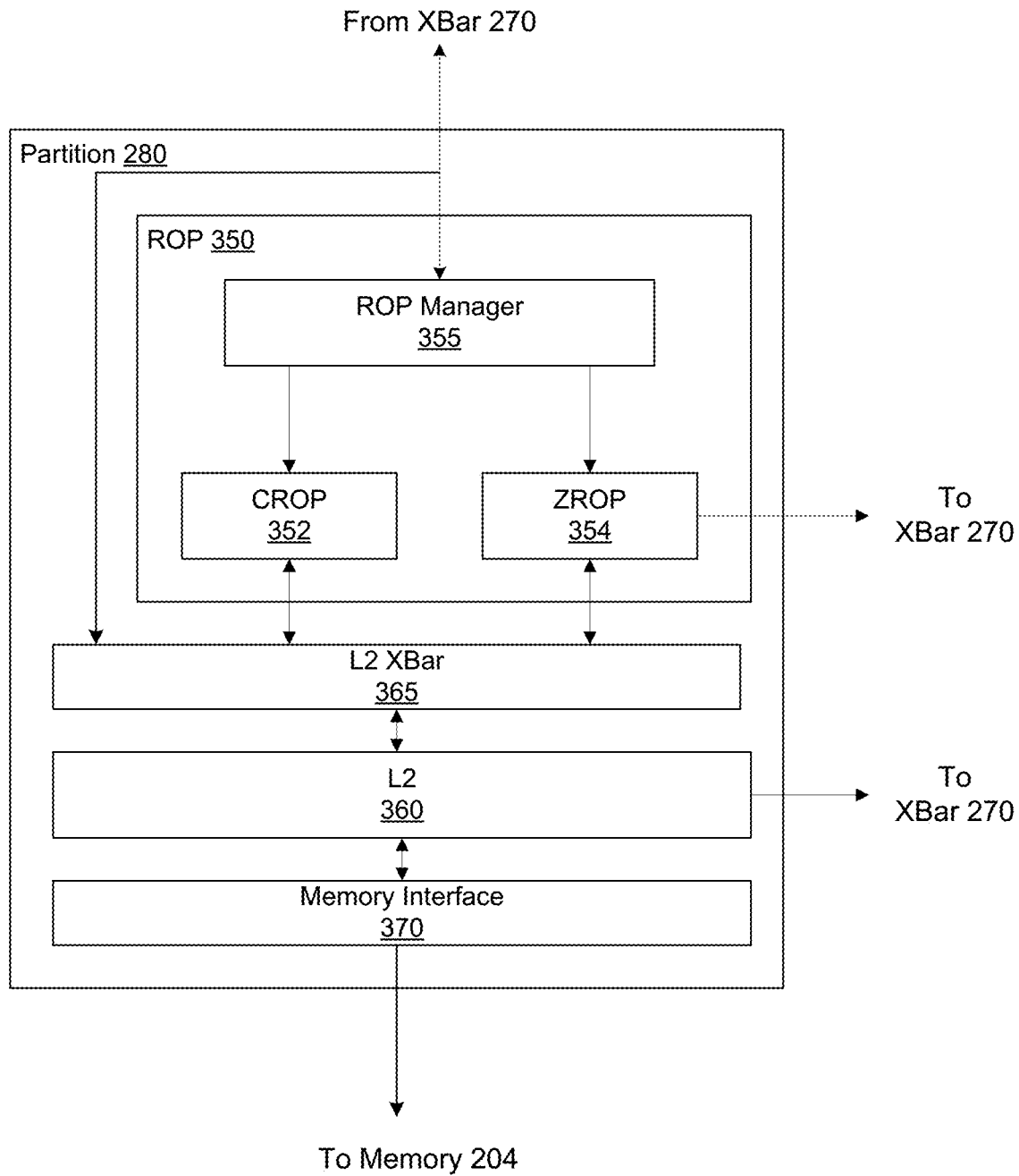
FIG. 3B illustrates a partition unit of the PPU of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 8.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
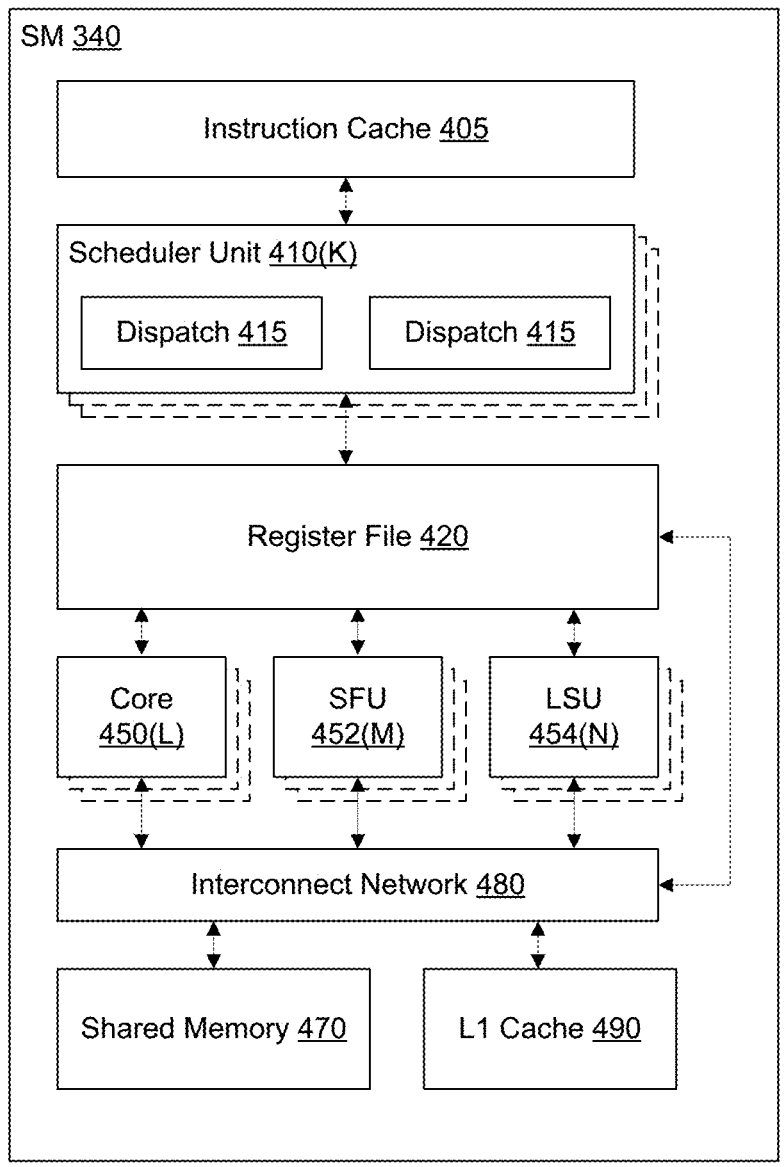
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, a shared memory 470 and an L1 cache 490.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 128, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., attribute evaluation, reciprocal square root, and the like), and N LSUs 454 that implement load and store operations between the shared memory 470 or L1 cache 490 and the register file 420. In one embodiment, the SM 340 includes 128 cores 450, 32 SFUs 452, and 32 LSUs 454.

Each SM 340 includes an interconnect network 480 that connects each of the functional units to the register file 420 and the LSU 454 to the register file 420, shared memory 470 and L1 cache 490. In one embodiment, the interconnect network 480 is a crossbar that can be configured to connect any of the functional units to any of the registers in the register file 420 and connect the LSUs 454 to the register file and memory locations in shared memory 470 and L1 cache 490.

The shared memory 470 is an array of on-chip memory that allows for data storage and communication between the SM 340 and the primitive engine 335 and between threads in the SM 340. In one embodiment, the shared memory 470 comprises 64 KB of storage capacity. An L1 cache 490 is in the path from the SM 340 to the partition unit 280. The L1 cache 490 can be used to cache reads and writes. In one embodiment, the L1 cache 490 comprises 24 KB of storage capacity.

The PPU 200 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 2, fixed function graphics processing units are bypassed, creating a much simpler programming model. In this configuration, the Work Distribution Unit 225 assigns and distributes blocks of threads directly to the TPCs 320. The threads in a block execute the same program, using a unique thread ID in the calculation to ensure each thread generates unique results, using the SM 340 to execute the program and perform calculations, shared memory 470 communicate between threads, and the LSU 454 to read and write Global memory through partition L1 cache 490 and partition unit 280.

When configured for general purpose parallel computation, the SM 340 can also write commands that scheduler unit 220 can use to launch new work on the TPCs 320.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
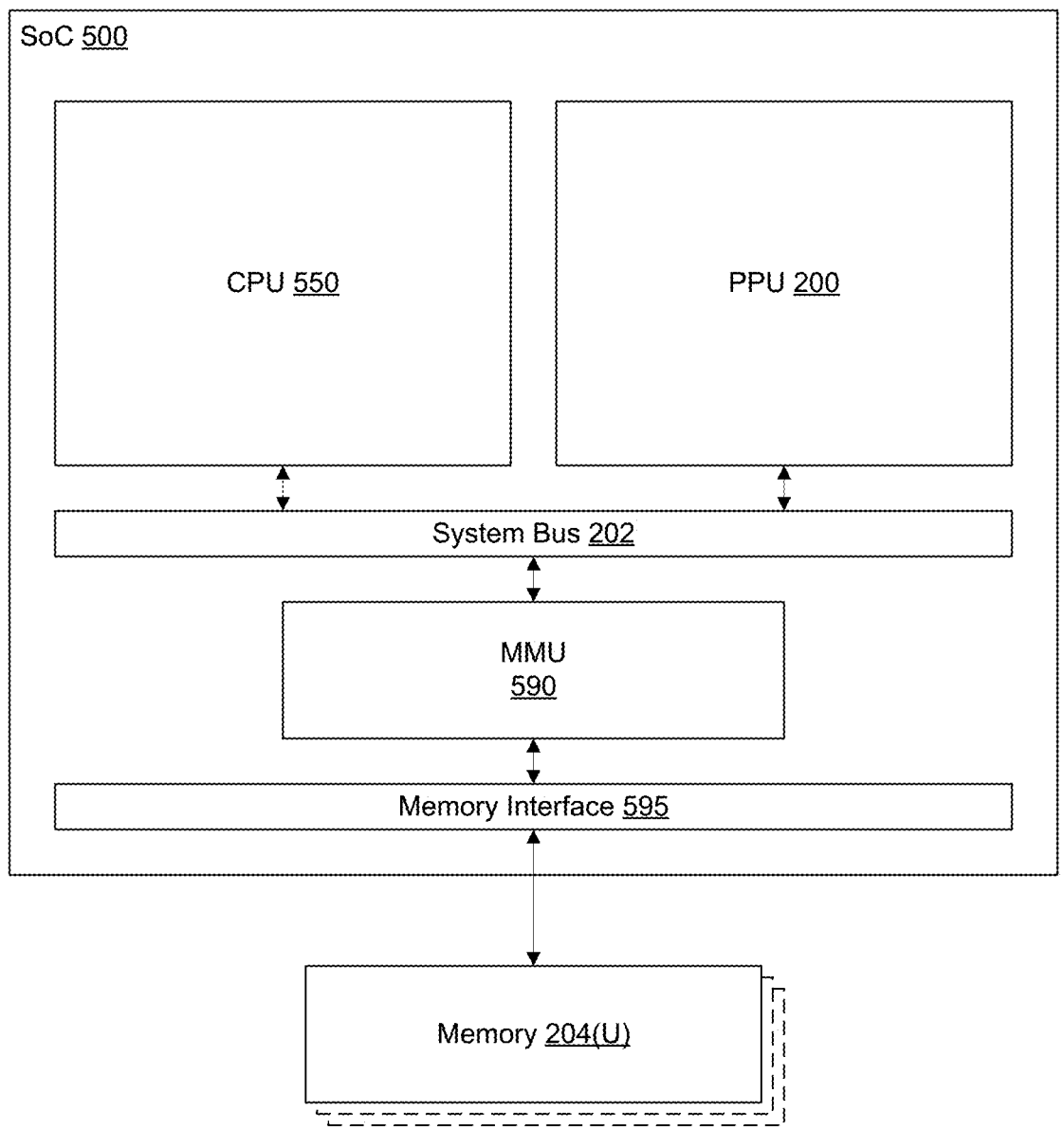
FIG. 5 illustrates a system-on-chip including the PPU of FIG. 2, in accordance with one embodiment.

FIG. 5 illustrates a System-on-Chip (SoC) 500 including the PPU 200 of FIG. 2, in accordance with one embodiment. As shown in FIG. 5, the SoC 500 includes a CPU 550 and a PPU 200, as described above. The SoC 500 may also include a system bus 202 to enable communication between the various components of the SoC 500. Memory requests generated by the CPU 550 and the PPU 200 may be routed through a system MMU 590 that is shared by multiple components of the SoC 500. The SoC 500 may also include a memory interface 595 that is coupled to one or more memory devices 204. The memory interface 595 may implement, e.g., a DRAM interface.

Although not shown explicitly, the SoC 500 may include other components in addition to the components shown in FIG. 5. For example, the SoC 500 may include multiple PPUs 200 (e.g., four PPUs 200), a video encoder/decoder, and a wireless broadband transceiver as well as other components. In one embodiment, the SoC 500 may be included with the memory 204 in a package-on-package (PoP) configuration.

Figure 6:
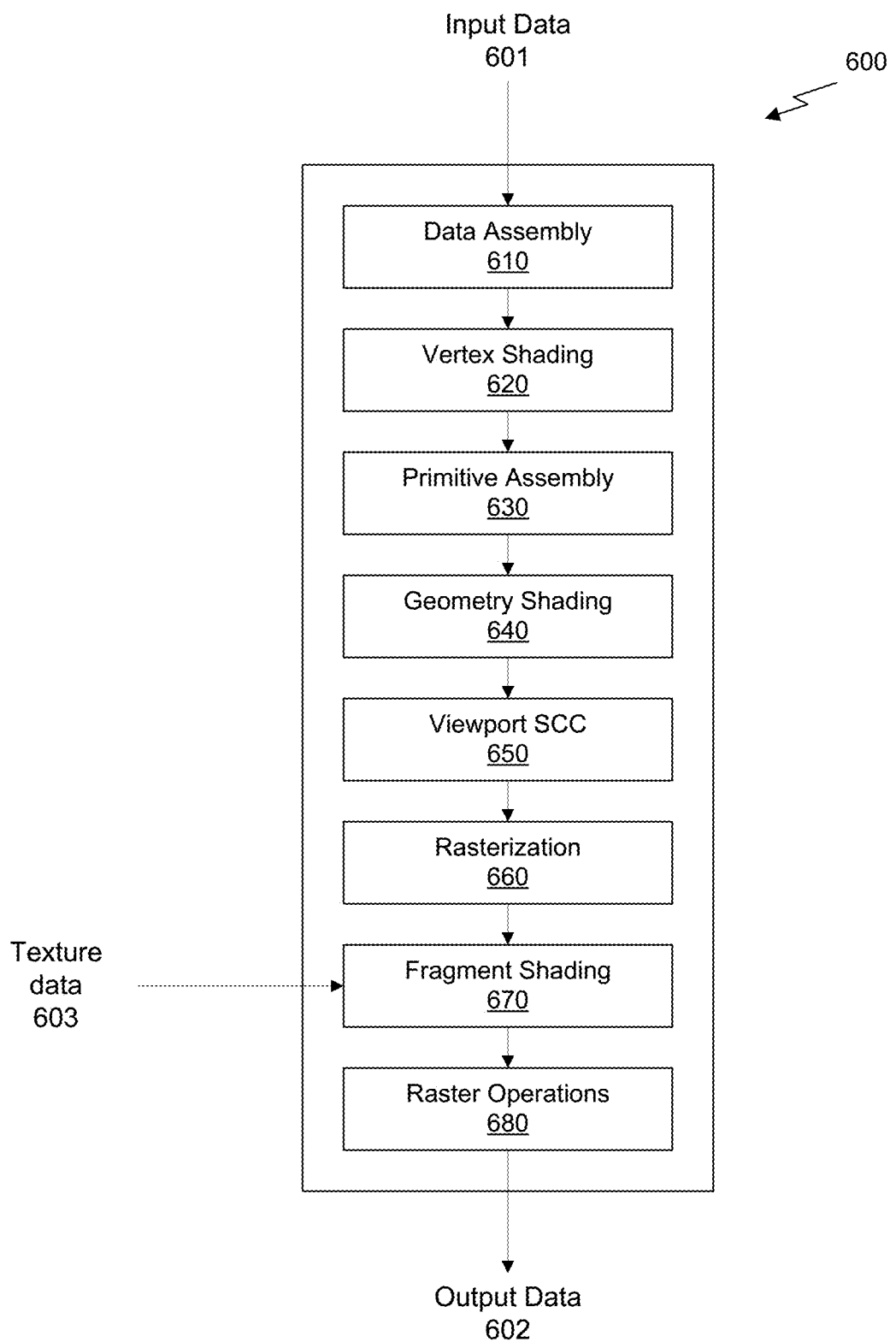
FIG. 6 is a conceptual diagram of a graphics processing pipeline implemented by the PPU of FIG. 2, in accordance with one embodiment.

FIG. 6 is a conceptual diagram of a graphics processing pipeline 600 implemented by the PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In one embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in one embodiment, the viewport SCC stage 650 may utilize the data. In one embodiment, primitive data processed by one or more of the stages in the graphics processing pipeline 600 may be written to a cache (e.g. L1 cache, a vertex cache, etc.). In this case, in one embodiment, the viewport SCC stage 650 may access the data in the cache. In one embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

In one embodiment, the fragment shading stage 670 may sample a texture map using the texture unit(s) 345 of PPU 200. Texture data 603 may be read from the memory 204 and sampled using the texture unit 345 hardware. The texture unit 345 may return a sampled value to the fragment shading stage 670 to be processed by the fragment shader.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 340 of the PPU 200.

The graphics processing pipeline 600 may be implemented via an application executed by a host processor, such as a CPU 550. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 550. In other instances, the device driver may perform operations, at least in part, by launching operations on the PPU 200 utilizing an input/output interface between the CPU 550 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

Matrix Multiply and Accumulate (MMA) Operation

The MMA operation extends the concept of the FMA operation to matrix input operands. In other words, many algorithms are designed around a fundamental arithmetic operation of multiplying a first input matrix with a second input matrix and summing the result with a third input matrix (i.e., a collector matrix). More specifically, the MMA operation may take two input matrices (A & B) and a third collector matrix ($C_{in}$) to perform the following operation:

$$C_{out}=A*B+C_{in} \quad \text{(Eq. 1)}$$

where A is an input matrix of size N×K, B is an input matrix of size K×M and C is the collector matrix of size N×M. The collector matrix C is read in from the register file, and the results of the MMA operation are accumulated and written over the data for the collector matrix C in the register file. In one embodiment, the collector matrix C and the result matrix D ($C_{out}$=D) may be different operands such that the result of the MMA operation is not written over the collector matrix C.

Figure 7:
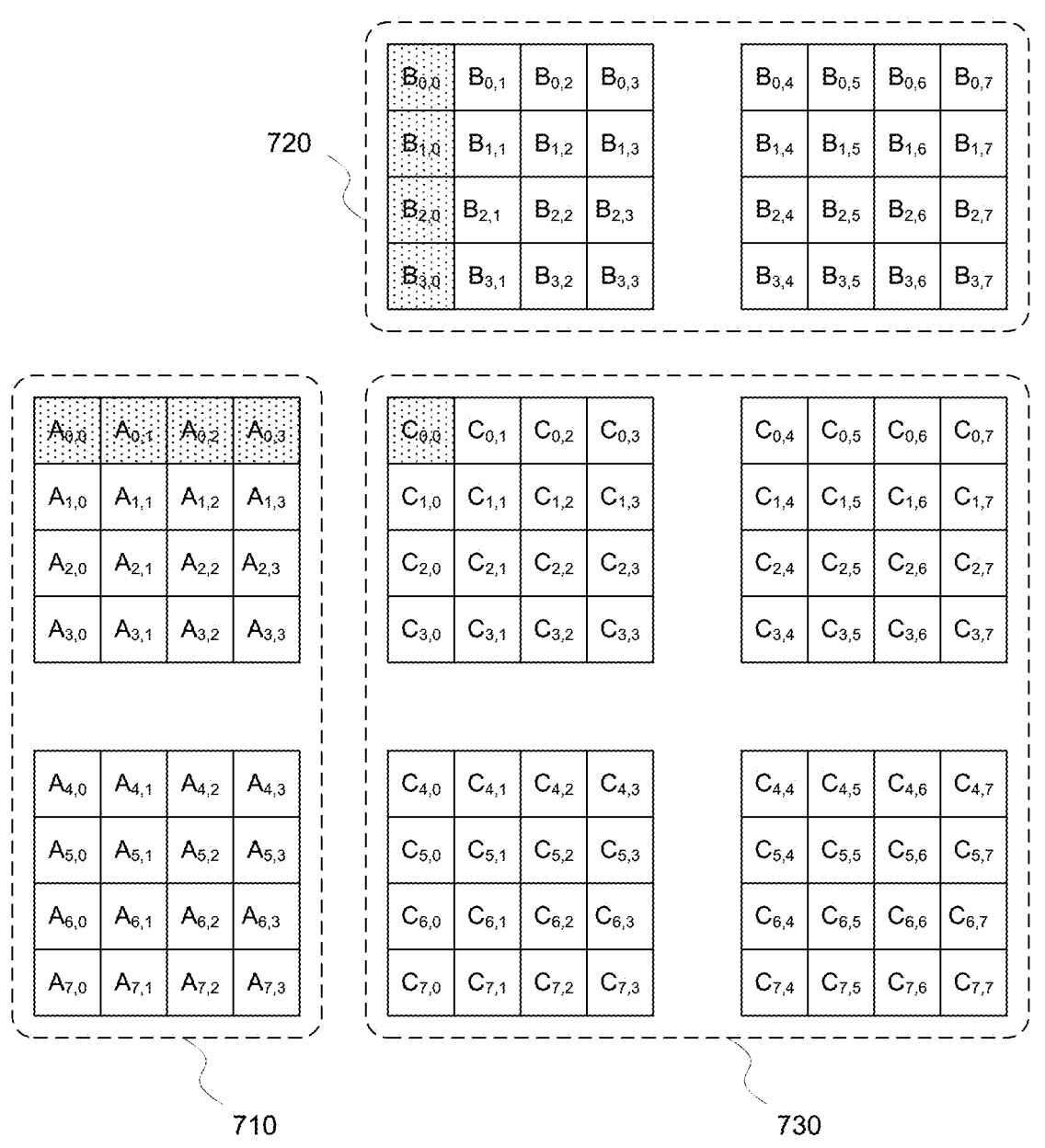

FIG. 7 illustrates an MMA operation, in accordance with one embodiment. The MMA operation multiplies an input matrix A 710 by an input matrix B 720, and accumulates the result in a collector matrix C 730. As shown in FIG. 7, the input matrix A is given as a 8×4 matrix, the input matrix B is given as a 4×8 matrix, and the collector matrix C is given as an 8×8 matrix. In other words, the MMA operation shown in FIG. 7 corresponds with (1) N=8; (2) M=8; and (3) K=4. However, nothing shown in FIG. 7 should be construed as limiting the MMA operation to these dimensions. In fact, a datapath of a processor can be designed to operate on any arbitrary size of the matrix operands, as will be shown in more detail below, and matrix operands that do not align exactly with the fundamental size of vector inputs in the dot product operations can be reduced into multiple intermediate operations using the datapath.

Returning now to FIG. 7, each element of the matrix operands can be a value encoded in a particular format. Various formats include, but are not limited to, single-precision floating-point values (e.g., 32-bit values as encoded according to the IEEE 754 standard); half-precision, floating-point values (e.g., 16-bit values as encoded according to the IEEE 754 standard); signed/unsigned integers (e.g., 32-bit two's complement integers); signed/unsigned short integers (e.g., 16-bit two's complement integers); fixed-point formats; as well as others.

In one embodiment, a processor may be designed as a 64-bit architecture such that data words are stored in registers having a width of 64-bits. Typically, the processor will then implement datapaths that operate on values encoded using up to 64-bit formats; however, some datapaths can be designed to operate on values encoded with a smaller number of bits. For example, a vector machine can be designed to pack two or four elements encoded with 32 or 16 bits, respectively, into each 64-bit register. The datapath is then configured to execute, on multiple similar vector units, the same instruction for a number of elements of the input vectors in parallel. However, it will be appreciated that vector machines typically execute the operations on the elements of the input vectors as completely separate operations. In other words, each of the elements packed into a single 64-bit register is only used in one vector operation and not shared between the different vector units.

In one embodiment, each element of the input matrix A 710 and each element of the input matrix B 720 may be encoded as a half-precision, floating-point value. If each data word is 64-bits wide, then four elements of the input matrices may be packed into each data word. Consequently, each register in the register file allocated to store at least a portion of the input matrix A 710 or the input matrix B 720 has the capacity to store four half-precision, floating-point elements of a corresponding input matrix. This enables efficient storage of the matrix operands to be implemented in a common register file associated with one or more datapaths of a processor.

It will be appreciated that the invention is not limited to only half-precision, floating-point data. In some embodiments, each element of the input matrices may be encoded as full-precision, floating-point values. In other embodiments, each element of the input matrices may be encoded as 16-bit signed integers. In yet other embodiments, the elements of the input matrix A 710 may be encoded as half-precision, floating-point values while the elements of the input matrix B 720 may be encoded as 32-bit signed integers. In such embodiments, elements of either input operand may be converted from one format to another format in a first stage of the datapath such that the formats of each of the input operands may be mixed within a single matrix multiply and accumulate operation. Furthermore, in another embodiment, the elements of the input matrix A 710 and the input matrix B 720 may be encoded as half-precision, floating-point values while the elements of the collector matrix C 730 may be encoded as full-precision, floating-point values. The datapath may even be designed to use elements of the collector matrix C 730 having a different precision than the elements of input matrix A 710 and input matrix B 720. For example, an accumulation register in the datapath may be expanded to store elements of the collector matrix C 730 as full-precision, floating-point values adding the initial value for elements of collector matrix C 730 to the result of a dot product operation performed on half-precision, floating-point values, which yield the equivalent of full-precision, floating-point values for the partial products if the multiplication is performed in a lossless manner.

As shown in FIG. 7, the matrices have been divided visually into 4×4 element sub-matrices. In an embodiment where each element of input matrix A 710 and input matrix B 720 is encoded as a half-precision, floating-point value (e.g., 16-bit floating point), then 4×4 element sub-matrices are essentially four, 4-element vectors from the matrices. In the case of the input matrix A 710, the matrix is divided into an upper set of vectors and a lower set of vectors. Each vector may correspond to a row of the input matrix A 710, where each row of four elements can be packed into a single 64-bit register. In the case of the input matrix B 720, the matrix is divided into a left set of vectors and a right set of vectors. Each vector may correspond to a column of the input matrix B 720, where each column of four elements can be packed into a single 64-bit register. In the case of collector matrix C 730, the matrix is divided into four 4×4 element sub-matrices as defined as an upper left quadrant, an upper right quadrant, a lower left quadrant, and a lower right quadrant. Each quadrant stores four, 4-vector elements from the collector matrix C 730 as long as the elements are encoded as half-precision, floating-point values. Each quadrant may correspond to a plurality of vectors (i.e., portions of rows or portions of columns) of the collector matrix C 730. Each quadrant also corresponds to a plurality of dot product operations performed using corresponding pairs of vectors from the input matrices.

For example, as shown in FIG. 7, a first element of the collector matrix $C_{0,0}$ is generated as the result of a dot product operation between a first vector $<A_{0,0}, A_{0,1}, A_{0,2}, A_{0,3}>$ of the input matrix A 710 and a first vector $<B_{0,0}, B_{1,0}, B_{2,0}, B_{3,0}>$ of the input matrix B 720. The first vector of the input matrix A 710 represents a first row of the input matrix A 710. The first vector of the input matrix B 720 represents a first column of the input matrix B 720. Thus, the dot product between these two vectors is given as:

$$C_{0,0} = A_{0,0}B_{0,0} + A_{0,1}B_{1,0} + A_{0,2}B_{2,0} + B_{0,3}B_{3,0} + C_{0,0},$$ (Eq. 2)

where the dot product operation is fundamentally the execution of four multiplication operations performed on corresponding elements of the two vectors followed by four addition operations that sum the four partial products generated by the multiplication operations along with the initial value of the element of the collector matrix. Each of the other elements of the collector matrix C 730 is then calculated in a similar manner using different combinations of the vectors of the input matrices. For example, another element of the collector matrix C 730, element $C_{3,2}$, is generated as the result of a dot product operation between a fourth vector $<A_{3,0}, A_{3,1}, A_{3,2}, A_{3,3}>$ of the input matrix A 710 and a third vector $<B_{0,2}, B_{1,2}, B_{2,2}, B_{3,2}>$ of the input matrix B 720. As shown in the MMA operation of FIG. 7, each vector of the input matrix A 710 is consumed by eight dot product operations configured to generate a corresponding row of elements of the collector matrix C 730. Similarly, each vector of the input matrix B 720 is consumed by eight dot product operations configured to generate a corresponding column of elements of the collector matrix C 730. While each of the 64 dot product operations to generate the elements of the collector matrix C 730 is unique as defined by using a different pair of vectors from the input matrices, each vector of the first input operand and each vector of the second input operand are consumed by multiple dot product operations and contribute to multiple individual elements of a result matrix.

It will be appreciated that the MMA operation described above can be accelerated by loading sets of vectors from the two input matrices into the inputs of a datapath, as long as the datapath can be configured to consume the sets of vectors in an efficient way in order to reduce the bandwidth between the register file and the inputs to the datapath. For example, in one embodiment, the first two rows of the upper left quadrant of collector matrix C 730 can be calculated by a datapath configured to receive the first two vectors in the upper set of vectors of the input matrix A 710 and the first four vectors of the left set of vectors of the input matrix B 720 as inputs, along with the first two vectors (i.e., rows) of the upper left quadrant of the collector matrix C 730. Such a datapath would require inputs for 864-bit words: two 64-bit words storing the two vectors of input matrix A 710, four 64-bit words storing the four vectors of input matrix B 720, and two 64-bit words storing the two vectors of collector matrix C 730. Again, if elements of collector matrix C 730 are encoded as full-precision, floating-point values (e.g., 32-bit floating point), then the size of the inputs to the datapath for the two vectors of collector matrix C 730 would be doubled to four 64-bit words.

The datapath can then be configured to execute the eight dot product operations in parallel in a single pass, serially in multiple passes, or some combination of serial and parallel operation. For example, the datapath can be designed to execute one 4-vector dot product operations per pass, which takes one vector from input matrix A 710 and one vector from input matrix B 720 and generates a single element of collector matrix C 730. The datapath is then operated over 8 passes utilizing different combinations of the 6 vectors from the two input matrices over the eight passes to generate eight different elements of the collector matrix C 730. Alternatively, the datapath can be designed to execute four 4-vector dot product operations per pass, which takes one vector from input matrix A 710 and four vectors from input matrix B 720 and generates four elements of collector matrix C 730 in parallel. The datapath is then operated over two passes utilizing different vectors from input matrix A 710 and the same four vectors from input matrix B 720 during each pass to generate the eight elements of the collector matrix C 730. It will be appreciated that the inputs of the datapath may be loaded from the register file once prior to multiple dot product operations being executed by the datapath using different combinations of inputs in each dot product operation. This will reduce the bandwidth between the register file and the datapath significantly. For example, only 6 vectors of the two input matrices A and B need to be loaded from the register file into the inputs of the datapath in order to perform 8 dot product operations, whereas performing all eight dot product operations individually using a datapath capable of performing a single dot product operation and only having an input capacity for two vectors would require 16 vectors to be loaded from the register file to the inputs of the datapath as the vectors are reused in multiple dot product operations.

It will also be appreciated that even if the datapath is configured to generate dot products that are a different length than the size of each of the vectors (i.e., dimension K of the input matrices does not equal the number of partial products generated within the datapath for a single dot product operation), the datapath is using an accumulator register (e.g., collector matrix C 730) such that each vector may be split into a number of sub-vectors and then loaded into the inputs of the datapath over multiple execution cycles (where the outputs of the collector matrix C 730 after each cycle are reloaded into the inputs of the datapath for the next cycle). Consequently, the dimension K of the input matrices A 710 and B 720 are not limited to a particular implementation of the dot product operation performed by the datapath. For example, if the datapath only generated 2-vector dot products (i.e., a dot product corresponding to a pair of two element vectors), then each row of the input matrix A 710 could be split into a first vector of a first half of the row and a second vector of a second half of the row, and each column of input matrix B 720 could be split into a first vector of a first half of the column and a second vector of the second half of the column. Then, the elements of the collector matrix C 730 are generated over multiple instruction cycles where the first half of the vectors of input matrix A 710 and the first half of the vectors of input matrix B 720 are loaded into the inputs of the datapath during a first instruction cycle, and the second half of the vectors of input matrix A 710 and the second half of the vectors of input matrix B 720 are loaded into the inputs of the datapath during a second instruction cycle along with the intermediate results stored in collector matrix C 730 during the first instruction cycle. The MMA operation can be reduced in this way for any arbitrary size of dimension K of the input matrices by splitting each of the vectors of the input matrices into a plurality of portions, each portion having a number of elements equal to the size of the dot product operation implemented by the datapath. Even if dimension K is not equally divided by the size of the dot product operation, the vectors can be padded with zeros in order to arrive at the correct result.

Figure 8:
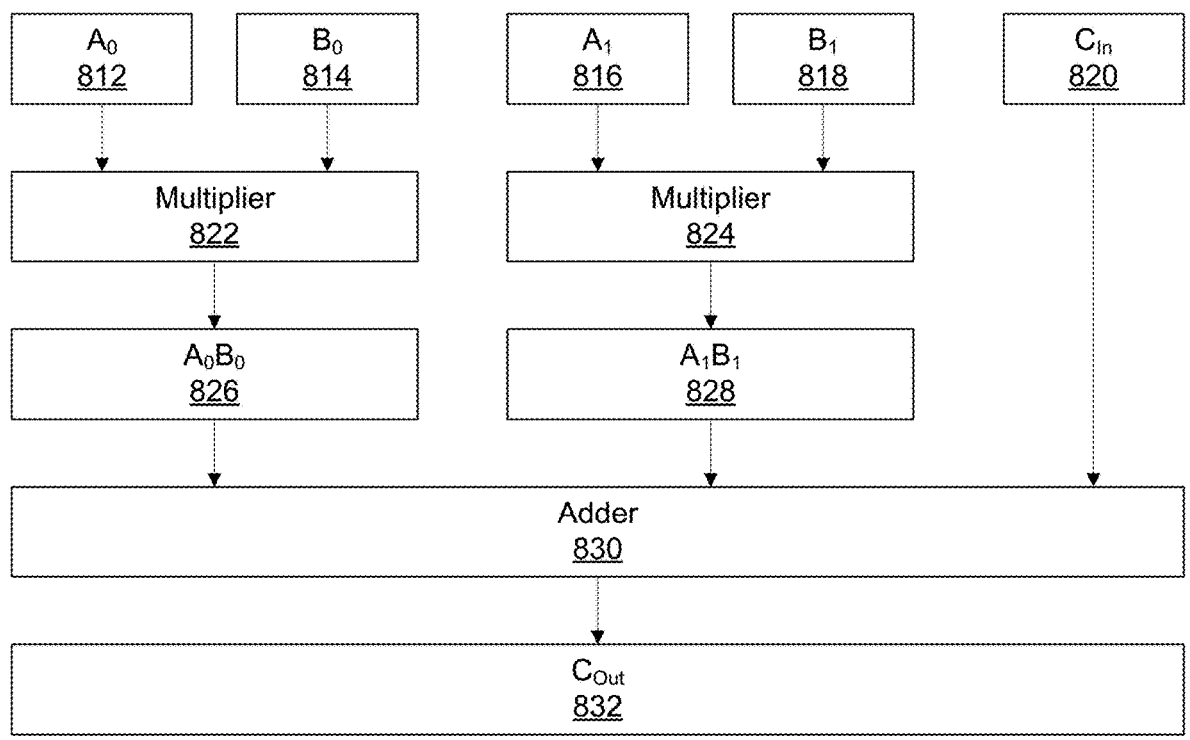
FIG. 8 is a conceptual diagram of a dot product operation, in accordance with one embodiment.

FIG. 8 is a conceptual diagram of a dot product operation, in accordance with one embodiment. The dot product operation essentially sums a plurality of partial products. The dot product operation may specify three operands, a vector A, a vector B, and a scalar collector C. The vector A and the vector B have the same length (i.e., number of elements). As shown in FIG. 8, the length of the vectors A and B is given as two; however, it will be appreciated that the dot product operation may have any length greater than or equal to two.

The dot product operation multiplies a pairs of elements from the input vectors A and B. As shown in FIG. 8, a first element $A_0$ 812 from input vector A is multiplied by a corresponding element $B_0$ 814 from input vector B in multiplier 822 to generate a partial product $A_0B_0$ 826. A second element $A_1$ 816 from input vector A is multiplied by a corresponding element $B_1$ 818 from input vector B in multiplier 824 to generate a partial product $A_1B_1$ 828. A three element adder 830 is then utilized to sum the partial product $A_0B_0$ 826, the partial product $A_1B_1$ 828, and the scalar collector value $C_{in}$ 820 to generate the result value $C_{out}$ 832. The result value $C_{out}$ 832 may be stored in the register for the scalar collector value $C_{in}$ 820 and reused to accumulate multiple dot product operations for longer vectors.

Again, the dot product operation can be expanded by adding additional multipliers 822, 824, etc. in parallel to calculate additional partial products and then summing the additional partial products with either a larger element adder or a tree of smaller adders that generate intermediate sums that are then summed again by an additional multi-element adder.

While the dot product operation can be implemented in a traditional FMA datapath, where each partial product is calculated during one pass of the datapath and accumulated into an accumulation register, it is more efficient to calculate multiple partial products of the dot product operation in parallel and then sum the results in a single, multi-stage pipeline. Furthermore, while multiple cores can be utilized simultaneously in SIMD/SIMT machines to compute partial products in parallel, an additional step of summing all of the partial products is still needed, which is not trivial to accomplish efficiently in such machines.

Figure 9:
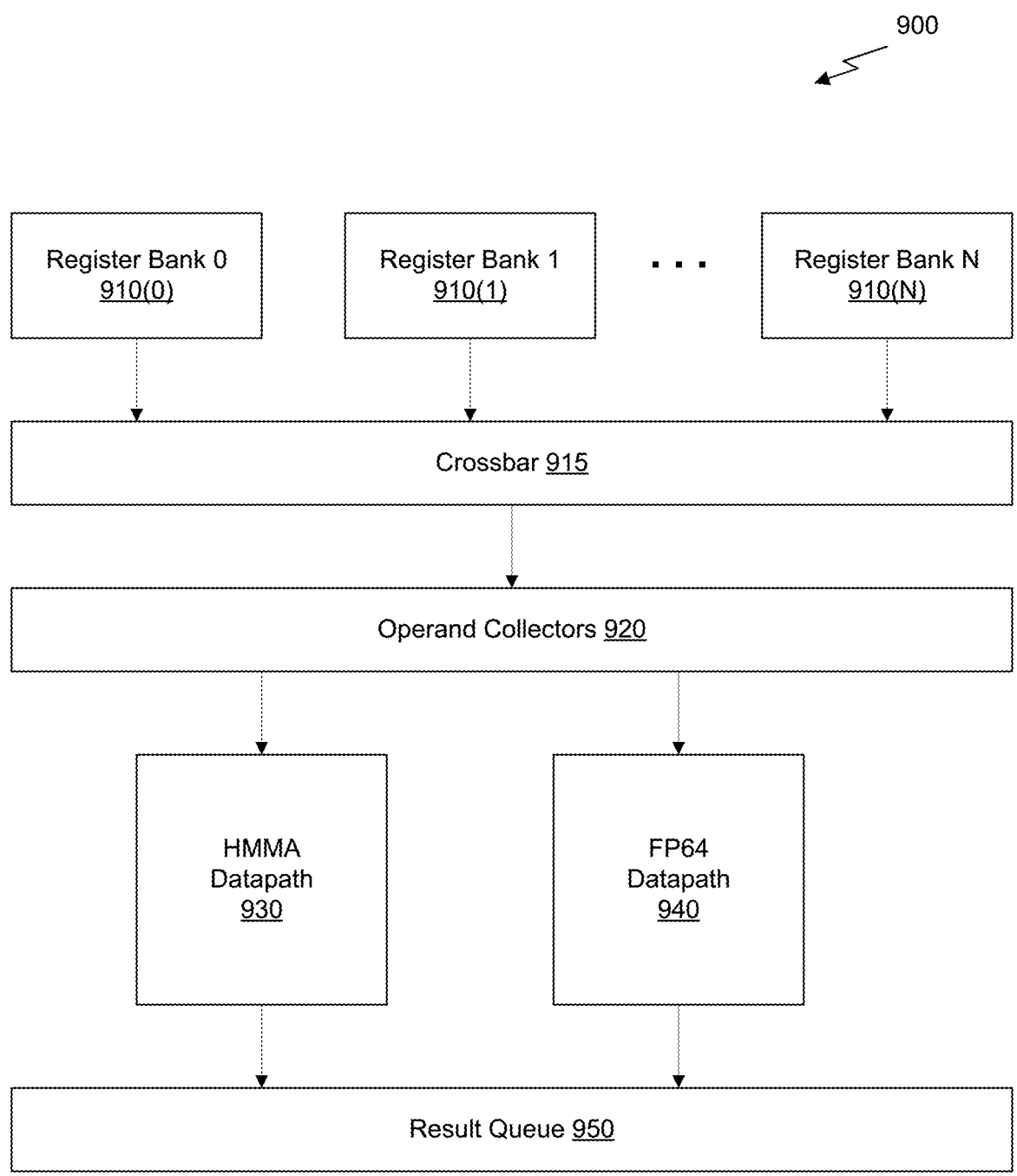
FIG. 9 illustrates a portion of a processor that includes a datapath configured to implement matrix operations, in accordance with one embodiment.

FIG. 9 illustrates a portion of a processor 900 that includes a datapath 930 configured to implement matrix operations, in accordance with one embodiment. The processor 900 may refer to a central processing unit (CPU), a graphics processing unit (GPU) or other parallel processing unit, a reduced instruction set computer (RISC) type processor, an application specific integrated circuit (ASIC), an field programmable gate array (FPGA), digital signal processor (DSP), and the like. Nothing in this disclosure should be construed as limiting the processor 900 to a parallel processing unit such as PPU 200.

As shown in FIG. 9, the processor 900 includes a multi-bank register file implemented as a plurality of register banks 910. Each register bank 910 may store a plurality of data words in a plurality of registers. Each register bank 910 may have a separate and distinct read and write port such that one register in the register bank 910 may be read and another register may be written in any given clock cycle. Consequently, one data word may be read from each register bank 910 simultaneously during a single clock cycle and loaded into the operand collectors 920. The register file is configured to store operands specified in an instruction for the MMA operation. In one embodiment, each operand specified in the instruction is a matrix having a plurality of elements in a two dimensional array of rows and columns, and each register may store one or more elements of a particular operand. Of course, in one embodiment, the register file may only include a single bank, meaning only one register may be read from the register file and loaded into the operand collectors 920 per clock cycle.

The processor 900 also includes a plurality of operand collectors coupled to an input of one or more datapaths. In one embodiment, the operand collectors 920 include a plurality of asynchronous flip-flops that enable data to be loaded into the operand collectors 920 during any particular clock cycle and then read from the operand collectors 920 in any subsequent clock cycle. In other words, the flip-flop is not set or reset during each clock cycle based on a signal at the input of the flip-flop. Instead, control logic determines when the flip-flop is set or reset based on the input signal and when the data stored in the flip-flop is transferred to the output of the flip-flop. This enables a plurality of operand collectors 920 to be loaded with operands from the register file over a number of clock cycles before multiple operands are provided to the inputs of a datapath in parallel during a single clock cycle. It will be appreciated that the operand collectors 920 can be implemented in a number of different ways including a variety different types of latches and/or flip-flops, and that various embodiments may implement the operand collectors 920 using different underlying technology. However, the function of the operand collectors 920 is to store, temporarily, the operands required to execute an operation on a datapath, where the operands can be loaded from the register file 910 over one or more clock cycles depending on which register banks 910 the operands are stored in and how many read ports are available in those register banks 910.

A crossbar 915 or other type of switchable interconnect may be coupled to the read ports of the register banks 910 and the inputs of the operand collectors. The crossbar 915 can be configured to route the signals from a read port associated with any of the register banks 910 to a particular operand collector 920. For example, a read port for register bank 1910(1) may include 64 interconnects carrying signals corresponding to the 64-bits included in a single register of the register file. Those 64 interconnects may be connected to one of a plurality of different operand collectors 920, each operand collector 920 including 64 flip-flops for storing the 64-bits encoded by the signals transmitted via the read port. If a datapath requires three operand collectors 920 coupled to the input of the datapath, each operand collector 920 including 64 flip-flops to store the 64-bits of a corresponding operand for the datapath, then the crossbar 915 may be configured to route the 64 signals on the 64 interconnects of the read port to any one of the three operand collectors 920.

The operand collectors 920 may be coupled to the inputs of one or more datapaths. As shown in FIG. 9, the operand collectors 920 may be coupled to a half-precision matrix multiply accumulate (HMMA) datapath 930 as well as a double-precision (64-bit), floating-point (FP64) datapath 940. The FP64 datapath 940 may be a conventional double-precision, floating-point FMA datapath that enables addition, subtraction, multiplication, division, as well as other operations to be performed on double-precision, floating-point operands. In one embodiment, the FP64 datapath 940 may include logic to perform an FMA operation for three scalar double-precision, floating-point operands (e.g., A, B, and C), as is well known in the art.

An output of the FP64 datapath 940 is coupled to a result queue 950. The result queue 950 stores results produced by the FP64 datapath 940. In one embodiment, the result queue 950 comprises a plurality of flip-flops for storing a plurality of bits of the results generated by the FP64 datapath 940. For example, the result queue 950 may include 64 flip-flops for storing a double-precision, floating-point result of the FP64 datapath 940. The result queue 950 enables the result to be stored temporarily while waiting for the availability of a write port to write the value back to the register file. It will be appreciated that the FP64 datapath 940 may be included in each of a plurality of similar cores that share the multi-bank register file 910. Only one core can write a value back to each register bank during a particular clock cycle. Consequently, if two or more cores produce results in a given clock cycle and both of the results need to be written back to the same register bank 910, then one can be written to the register bank 910 during a first clock cycle and the other can be written to the register bank 910 during a second clock cycle.

It will be appreciated that the result queue 950 may be in addition to an accumulation register included internally in the datapath that does not need to be written back to the register file between the executions of multiple instructions. For example, an FMA instruction may include A, B, and C operand during a first instruction and then only A and B operands during one or more subsequent instructions, utilizing the internal accumulation register to chain together a number of instructions reusing the accumulated value of C as the third operand of each subsequent instruction. In some embodiments, the result queue 950 may be omitted if the result generated by the FP64 datapath 940 is always written to the register file immediately as it becomes available. However, such architectures require more advanced control of the memory allocation of the multi-bank register file to avoid any conflicts with the write ports as well as knowledge of pipeline length for two or more cores that share the register file to properly schedule which cores will need access to a given write port during a particular clock cycle. In processors where there are a large number of cores, it may be easier to utilize the result queue 950 to write values back to the register file on an as needed basis, stalling any core from completing a subsequent instruction until the result has been written back into the register file.

In one embodiment, the HMMA datapath 930 shares the same operand collectors 920 available to the FP64 datapath 940. The HMMA datapath 930 and FP64 datapath 940 may be included in a common core of the processor 900, the processor 900 including a plurality of cores that each includes one FP64 datapath 940 and HMMA datapath 930 as well as, possibly, an integer arithmetic logic unit (ALU). In one embodiment, the HMMA datapath 930 is configured to execute a matrix multiply and accumulate (MMA) operation. An instruction for the MMA operation specifies a plurality of matrix operands configured to execute an operation equivalent to the function specified by Equation 1, set forth above.

In one embodiment, the plurality of operand collectors 920 include storage for at least two vectors of a first operand specified in the instruction (i.e., input matrix A 710) and at least two vectors of a second operand specified in the instruction (i.e., input matrix B 720). Each vector of the at least two vectors having at least two elements in a row or column of the matrix operand. For example, in one embodiment, the HMMA datapath 930 is configured to receive two vectors from a first operand and four vectors from a second operand as inputs to the datapath. Consequently, the number of operand collectors 920 should be sufficient to store at least six vectors of the two input matrix operands (e.g., a minimum of six 64-bit operand collectors). Other embodiments may require more or less operand collectors 920 depending on the design of the HMMA datapath 930.

In one embodiment, the HMMA datapath 930 is also configured to receive at least two vectors of a third operand specified in the instruction (i.e., collector matrix C 730). The collector matrix C 730 is summed with the result of the multiplication of the first and second operand specified in the instruction. The number of combined elements in the vectors from the third operand must match a product of the number of vectors of the first operand and the number of vectors of the second operand. For example, if the plurality of operand collectors 920 store two vectors (e.g., rows) of the input matrix A 710 and four vectors (e.g., columns) of the input matrix B 720, then the number of elements in the at least two vectors of the collector matrix C 730 must be equal to eight. In addition, the indices of the elements of the third operand must match the indices of the vectors of the first operand and the second operand. For example, if the two vectors of the first operand correspond to the first and second row of the input matrix A 710, and the four vectors of the second operand correspond to the first through fourth rows of the input matrix B 720, then the indices of the elements of the third operand, which are in two dimensions, must match the <row, column> index vector associated with a dot product of either vector of the input matrix A 710 with any vector of the input matrix B 720.

Again, the HMMA datapath 930 generates a plurality of elements of a result matrix at an output of the HMMA datapath 930. Each element in the plurality of elements of the result matrix is generated by calculating at least one dot product of corresponding pairs of vectors selected from the matrix operands. A dot product operation may include the step of accumulating a plurality of partial products into the result queue 950. Each partial product in the plurality of partial products is generated by multiplying each element of a first vector with a corresponding element of a second vector. An example of a dot product operation is given above in Equation 2. It will be appreciated that, in one embodiment, the plurality of partial products are calculated in parallel in the HMMA datapath 930 and accumulated using a tree of adders internal to the HMMA datapath 930 before being output to the result queue 950. In yet another embodiment, the partial products are calculated in series within the HMMA datapath 930 over a number of passes, accumulating each partial product in an accumulation register internal to the HMMA datapath 930. When all partial products, as well as an addend value from the collector matrix C 730, have been accumulated into the internal accumulation register over the number of passes, the final result is output to the result queue 950.

In one embodiment, the processor 900 is implemented as the PPU 200. In such an embodiment, each core 450 in an SM 340 includes an HMMA datapath 930 as well as an FP64 datapath 940 and, optionally, an integer ALU. Register file 420 may implement the one or more memory banks 910. The crossbar 915 and operand collectors 920 may be implemented between the register file 420 and the one or more cores 450. Furthermore, the result queue 950 may be implemented between the one or more cores 450 and the interconnect network 480, which enables the result stored in the result queue 950 to be written back to the register file 420. Consequently, the processor 900 is a PPU 200 comprising a plurality of SMs 340, each SM 340 in the plurality of SMs 340 including the register file 420 and a number of cores 450, each core 450 in the number of cores 450 including an instance of the HMMA datapath 930.

The PPU 200 implements a SIMT architecture that enables a number of threads to be executed in parallel on a plurality of cores 450 in a number of SMs 340. In one embodiment, the MMA operation is configured to be executed by a number of threads in parallel on a number of cores 450. Each thread is configured to generate a portion of the elements in the result matrix (e.g., collector matrix C 730) on a particular core 450 using different combinations of the vectors of the operands specified in the instruction for the MMA operation.

For example, as shown in FIG. 7, an MMA operation on an 8×4 input matrix A 710 and a 4×8 input matrix B 720 can be executed on eight threads simultaneously. A first thread is assigned the first two vectors (e.g., $<A_{0,0}, A_{0,1}, A_{0,2}, A_{0,3}>$ & $<A_{1,0}, A_{1,1}, A_{1,2}, A_{1,3}>$) of input matrix A 710 and the first four vectors (e.g., $<B_{0,0}, B_{1,0}, B_{2,0}, B_{3,0}>$, $<B_{0,1}, B_{1,1}, B_{2,1}, B_{3,1}>$, $<B_{0,2}, B_{1,2}, B_{2,2}, B_{3,2}>$, & $<B_{0,3}, B_{1,3}, B_{2,3}, B_{3,3}>$) of the input matrix B 720. The first thread generates eight elements included in two vectors of the result matrix (e.g., $<C_{0,0}, C_{0,1}, C_{0,2}, C_{0,3}>$ & $<C_{1,0}, C_{1,1}, C_{1,2}, C_{1,3}>$). Similarly, a second thread is assigned the first two vectors (e.g., $<A_{0,0}, A_{0,1}, A_{0,2}, A_{0,3}>$ & $<A_{1,0}, A_{1,1}, A_{1,2}, A_{1,3}>$) of input matrix A 710 and the next four vectors (e.g., $<B_{0,4}, B_{1,4}, B_{2,4}, B_{3,4}>$, $<B_{0,5}, B_{1,5}, B_{2,5}, B_{3,5}>$, $<B_{0,6}, B_{1,6}, B_{2,6}, B_{3,6}>$, & $<B_{0,7}, B_{1,7}, B_{2,7}, B_{3,7}>$) of the input matrix B 720. The second thread generates eight elements included in two different vectors of the result matrix (e.g., $<C_{0,4}, C_{0,5}, C_{0,6}, C_{0,7}>$ & $<C_{1,4}, C_{1,5}, C_{1,6}, C_{1,7}>$). A third thread is assigned the next two vectors (e.g., $<A_{2,0}, A_{2,1}, A_{2,2}, A_{2,3}>$ & $<A_{3,0}, A_{3,1}, A_{3,2}, A_{3,3}>$) of input matrix A 710 and the first four vectors (e.g., $<B_{0,0}, B_{1,0}, B_{2,0}, B_{3,0}>$, $<B_{0,1}, B_{1,1}, B_{2,1}, B_{3,1}>$, $<B_{0,2}, B_{1,2}, B_{2,2}, B_{3,2}>$, & $<B_{0,3}, B_{1,3}, B_{2,3}, B_{3,3}>$) of the input matrix B 720. The third thread generates eight elements included in two vectors of the result matrix (e.g., $<C_{2,0}, C_{2,1}, C_{2,2}, C_{2,3}>$ & $<C_{3,0}, C_{3,1}, C_{3,2}, C_{3,3}>$). The other five threads do similar with additional combinations of vectors from the input matrix A 710 and the input matrix B 720.

It will be appreciated that a core 450 is allocated to each thread, the vectors assigned to that thread are loaded into the operand collectors 920 for the core 450, and the elements of the result matrix are then generated by executing the MMA operation on the HMMA datapath 930 in the core 450. In one embodiment, each core is coupled to a dedicated set of operand collectors 920 only coupled to that core 450. In another embodiment, a plurality of cores 450 share operand collectors 920. For example, two cores 450 having two HMMA datapaths 930 could share a set of operand collectors 920, where common vectors assigned to two threads being scheduled on the two cores 450 are shared by both cores 450. That way, the common vectors assigned to two or more threads are not loaded into two separate sets of operand collectors 920. For example, the first two threads discussed above are both assigned the first two vectors of input matrix A 710 while being assigned different sets of vectors of input matrix B 720. Thus, the operand collectors 920 being used to store the vectors of the input matrix A 710 could be shared between two cores 450 by coupling those operand collectors 920 to the inputs of both HMMA datapaths 930.

It will be appreciated that any number of threads can be combined to increase the size of the MMA operation. In other words, the dimensions M, N, and K of the MMA operation may be increased without increasing the execution time by adding more threads to handle the additional calculations in parallel. Alternatively, increasing the size of the MMA operation can also be accomplished on a fixed number of cores 450 by executing multiple instructions on each core 450 over a number of instruction cycles. For example, the first thread could be executed on a particular core 450 during a first instruction cycle and the second thread could be executed on the particular core 450 during a second instruction cycle. There may be benefits to executing the MMA operation over multiple instruction cycles as the vectors of the input matrix A 710 are shared between the first thread and the second thread and, therefore, the vectors of the input matrix A 710 will not need to be reloaded from the register banks 910 into the operand collectors 920 between execution of the two instructions over two instruction cycles.

Figure 10:
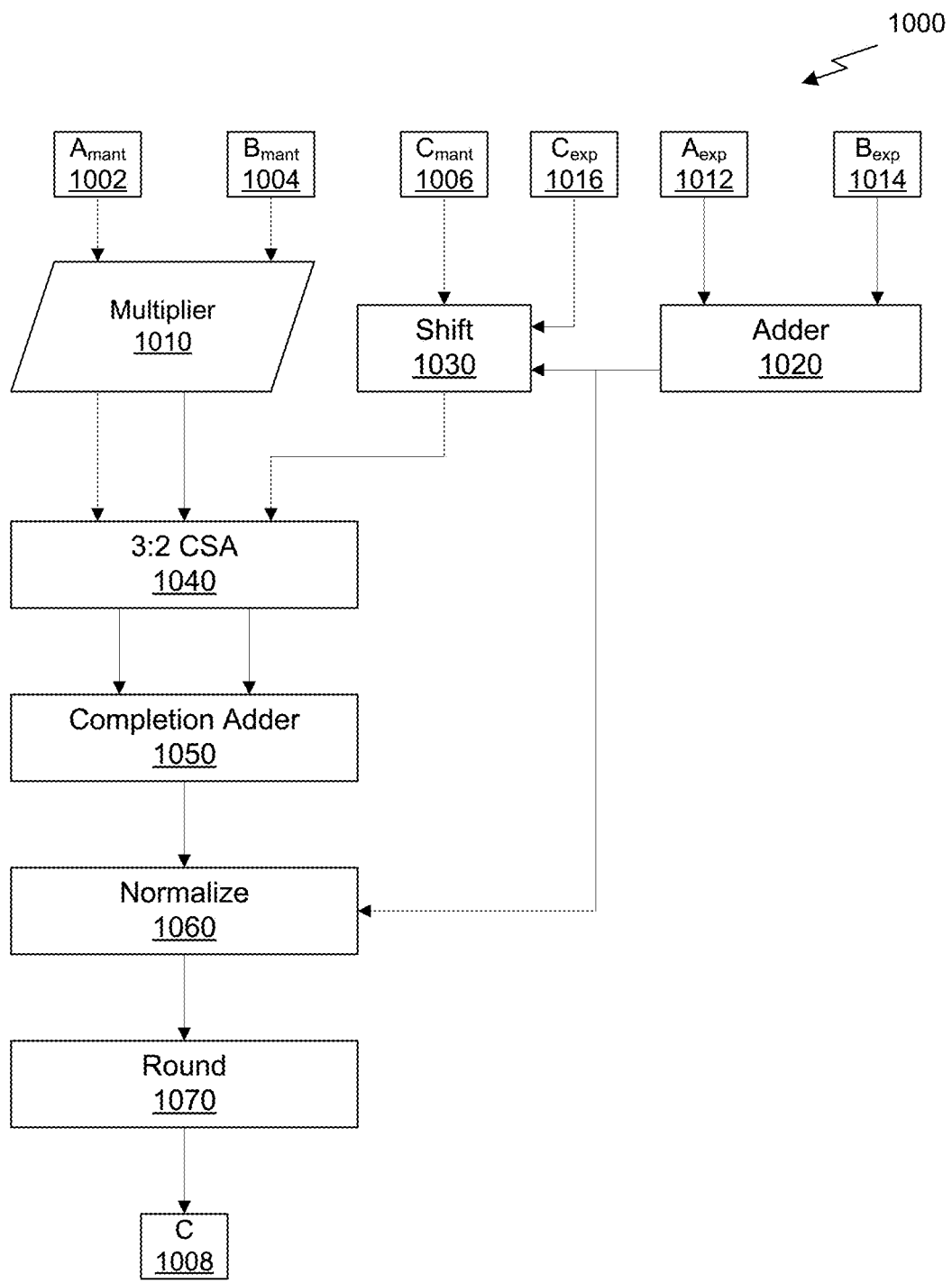
FIG. 10 illustrates a conventional double-precision, floating-point fused multiply accumulate datapath, in accordance with one embodiment.

FIG. 10 illustrates a conventional double-precision, floating-point FMA datapath 1000, in accordance with one embodiment. The conventional double-precision, floating-point FMA datapath 1000 illustrates one possible implementation of the FP64 datapath 940 of processor 900. The datapath 1000 implements an FMA operation that takes three operands (A, B, and C) as input, multiplies operand A by operand B and sums the product with operand C. Each of the three operands are double-precision, floating-point values encoded with 64-bits: 1 sign bit, 11 exponent bits, and 52 mantissa bits.

As shown in FIG. 10, the datapath 1000 includes a multiplier 1010 that multiplies the mantissa bits from the A operand 1002 with the mantissa bits from the B operand 1004. In one embodiment, the multiplier 1010 may be, e.g., a Wallace tree that multiplies each bit of one mantissa by each bit of the other mantissa and combines the partial products with a tree of adders in a plurality of reduction layers to generate two n-bit integers that are added together to get the binary result of the multiplication. If the multiplier is designed for 64-bit floating point numbers, thereby multiplying two 52-bit mantissas plus a hidden bit (for normalized values), then the multiplier 1010 may be a 53×53 Wallace tree that generates two 106-bit values at the output that are added together in the 3:2 carry sum adder (CSA) 1040.

In parallel, the exponent bits from the A operand 1012 are added to the exponent bits from the B operand 1014 in an adder 1020. The adder 1020 may be a full adder rather than a CSA adder because the exponent bits are only 11-bits wide, and the full addition can be propagated through the adder 1020 in similar time to propagating the result of the multiplier 1010 through the reduction layers of the Wallace tree to generate the two integers. The result generated by adder 1020 gives the exponent associated with the result of the multiplication of the mantissa bits. The exponent associated with the result is then used to shift (e.g., at 1030) the mantissa bits from the C operand 1006 based on the exponent bits of the C operand 1016. It will be appreciated that the exponents must be the same when the addition of the mantissa bits is performed, and incrementing or decrementing the exponent of a floating-point value is equivalent to shifting the mantissa left or right. The shifted mantissa bits of the C operand 1006 are then added to the two integers generated by the multiplier 1010 in the 3:2 CSA 1040. The 3:2 CSA 1040 generates a carry value and a sum value, which represent the result of the addition, where each bit of the sum value represents a result of adding three corresponding bits, one bit from each of the three inputs, and where each bit of the carry value represents a carry bit that indicates whether the addition of those three corresponding bits resulted in a carry (i.e., a bit that needs to be added to the next most significant bit in the sum value). The 3:2 CSA 1040 enables all of the carry and sum bits to be calculated at once rather than having to propagate the carry bits through to each subsequent three bit addition operation.

The carry value and sum value from the 3:2 CSA 1040 are then summed in a completion adder 1050. The result generated by the completion adder 1050 represents the sum of the three mantissa values from the three operands. However, this sum is not normalized, whereas floating point values are normalized. Consequently, the result generated by the completion adder 1050 will be shifted a number of bits by the normalizing logic 1060 such that the most significant bit in the result is a 1, and the exponent generated by adder 1020 will be incremented or decremented accordingly by the normalizing logic 1060 based on the number of bits the result is shifted. Finally, the normalized result is rounded by the rounding logic 1070. The result generated by the completion adder 1050 is much larger than 52 bits. Since the result cannot be loss-lessly encoded in the 52 mantissa bits of a double-precision, floating-point value, the result is rounded such that the mantissa bits of the result will only be 52 bits wide.

It will be appreciated that illustration of the sign logic has been omitted from FIG. 10, but sign logic and the operation of conventional floating-point datapaths are well understood by those of skill in the art and should be considered as within the scope of the datapath 1000. The sign bit, normalized exponent bits, and rounded mantissa bits are output by the datapath 1000 and stored in the C operand 1008 as a double-precision, floating-point result.

Figure 11:
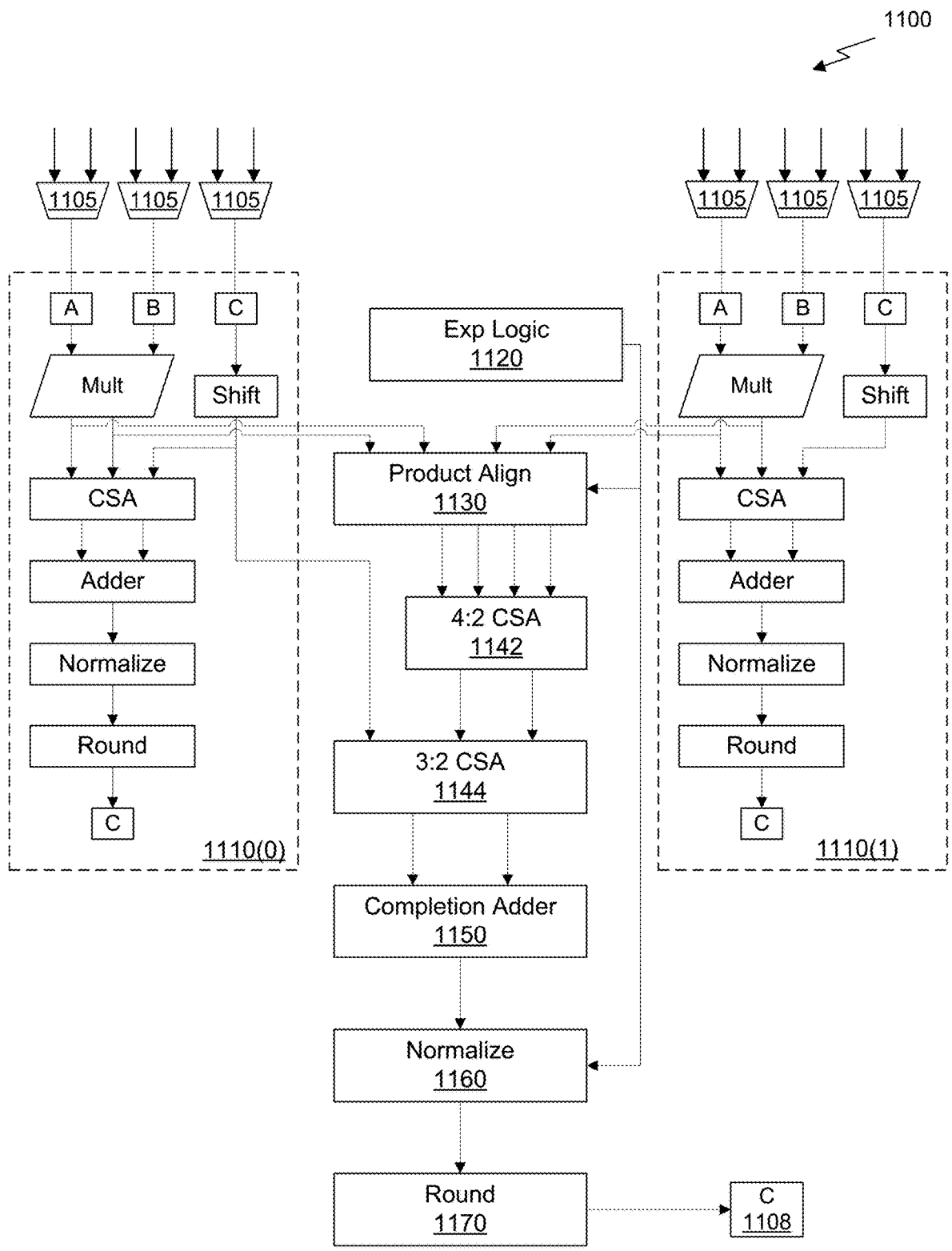
FIG. 11 illustrates an half-precision matrix multiply and accumulate datapath, in accordance with one embodiment.

FIG. 11 illustrates an HMMA datapath 1100, in accordance with one embodiment. The HMMA datapath 1100 includes a pair of half-precision, floating-point FMA units 1110. Like datapath 1000, each of the units 1110 implements an FMA operation that takes three operands (A, B, and C) as input, multiplies operand A by operand B and sums the product with operand C. However, unlike datapath 1000, each of the three operands are half-precision, floating-point values encoded with 16-bits: 1 sign bit, 5 exponent bits, and 10 mantissa bits. The units 1110 are similar in implementation to the datapath 1000, except that the components of the units 1110 are significantly smaller than similar components of the datapath 1000 because the number of bits in each operand is reduced from 64-bits to 16-bits. Consequently, the multiplier of datapath 1100 may be implemented as an 11×11 Wallace tree rather than a 53×53 Wallace tree. Similarly, the size of the 3:2 CSA adder, completion adder, normalizing logic, and rounding logic are reduced by approximately $\frac{1}{4}^{th}$. Otherwise, the description of the functionality of the datapath 1000 applies equally as well to the half-precision, floating-point FMA units 1100, only on operands represented using less bits of precision.

It will be appreciated that each unit 1110 is used to multiply two half-precision, floating-point values from two input operands and sum the product with an addend from a third input operand. Thus, each unit 1110 can be used in parallel to compute a partial product of a dot product operation. In one embodiment, a first unit 1110(0) is provided one element from each of two input vectors $\vec{A}$ & $\vec{B}$ and a second unit 1110(1) is provided the other element of each of the two input vectors $\vec{A}$ & $\vec{B}$, where each input vector includes two elements. For example, a first unit 1110(0) is provided elements $A_0$ and $B_0$ of input vectors $\vec{A}$ & $\vec{B}$, respectively. The size of the dot product operation corresponds to a number of units 1110 implemented in parallel. However, summing the partial products generated by each of the units 1110 requires additional combinatorial logic.

It will be appreciated that, if the HMMA datapath 1100 were implemented as a vector machine, the combinatorial logic could be ignored and each unit 1110 could execute an FMA operation on scalar half-precision, floating-point values to generate two FMA results at the respective outputs of each unit 1110, individually. In fact, the HMMA datapath 1100 may be configured to do just that in some embodiments. However, the additional combinatorial logic is required to implement a dot product operation and generate a single result using the multipliers in both units. Thus, the HMMA datapath 1100 may be configured in two modes of operation, a first mode where each unit 1110 executes an FMA operation in parallel on vector inputs, and a second mode where each unit 1110 generates a partial product that is passed to the combinatorial logic. The combinatorial logic then sums the partial products with an addend from a third input operand.

In one embodiment, the combinatorial logic includes exponent comparison logic 1120, product alignment logic 1130, a tree of carry sum adders including a 4:2 CSA 1142 and a 3:2 CSA 1144, a completion adder 1150, normalizing logic 1160, and rounding logic 1170. The product alignment logic 1130 receives, from each unit 1110, the two integers output by the multiplier for the unit 1110. The product alignment logic 1130 is controlled by the exponent comparison logic 1120, which receives the exponents associated with the partial products. In one embodiment, each of the units 1110 includes logic such as adder 1020 that sums the exponent bits associated with the two input operands (e.g., $A_i$, $B_i$ for unit i). The output of the logic equivalent to adder 1020 is then routed from the unit 1110 to the exponent comparison logic 1120. The exponent comparison logic 1120 then compares the exponent values associated with the partial products generated by the multipliers in each unit 1110, and uses the difference in exponents to generate a control signal that causes the product alignment logic 1130 to shift the bits of one of the partial products generated by the multipliers in each unit 1110. Again, the partial products represent mantissas of a floating-point value and, therefore, the bits of the partial products must first be aligned so that the exponents match prior to performing the addition operation.

The shifted partial products are then passed to a 4:2 CSA 1142 that sums the four integer values and generates a carry value and a sum value. The output of the 4:2 CSA are passed as two inputs of a 3:2 CSA 1144 that sums the carry value and sum value with the addend from the third operand C. It will be appreciated that the addend can be either half-precision, floating-point format or single-precision, floating point format encoded in 32-bits: 1 sign bit, 8 exponent bits, and 23 mantissa bits. Remember that the result of multiplying two 11-bit values (10 mantissa bits plus a leading hidden bit) is a 22 bit value. Consequently, even though the partial products are generated based on half-precision, floating-point values, the partial products will be nearly the same width as the mantissa for a single-precision, floating-point addend from the third operand. Of course, the addend can also be a half-precision, floating-point value similar to the elements of the input vectors $\vec{A}$ & $\vec{B}$.

The result output by the 3:2 CSA 1144 is passed to a completion adder 1150, which is similar to completion adder 1050, except smaller in width. The result generated by the completion adder 1150 is then passed to the normalizing logic 1160 and rounding logic 1170 to shift and truncate the result. The normalizing logic 1160 receives the value of the common exponent, after shifting, for the two partial products and shifts the result, by incrementing or decrementing the exponent value and shifting the bits of the result left or right, until a MSB of the result is a 1. The rounding logic 1170 then truncates the result to fit the width of the mantissa bits in at least one floating-point format. The sign bit, normalized exponent bits, and rounded mantissa bits are output by the datapath 1100 and stored in the C operand 1108 as either a half-precision, floating-point value or a single-precision, floating-point value.

Returning to the top of the datapath 1100, it is apparent that selection logic 1105 is coupled to the inputs of the three operands of each unit 1110. As described above, a two-element vector $\vec{A}$ and a two-element vector $\vec{B}$ plus a scalar operand C can be used to perform a dot product operation using the datapath 1100. While a datapath that can be configured to execute a dot product operation, generally, is more useful than a datapath that can only be configured to execute an FMA operation, additional functionality is added by including the selection logic 1105 that makes an MMA operation more efficient when the datapath 1100 is coupled to additional operand collectors 920.

For example, the operand collectors 920 coupled to the datapath 1100 may include a number of operand collectors 920 that are sufficient to store at least two input vectors $\vec{A}$ associated with input matrix A 710 and at least two input vectors $\vec{B}$ associated with input matrix B 720, plus one or more vectors associated with a plurality of elements of a collector operand C 730. The selection logic 1105 is then used to select elements from different vectors stored in the operand collectors 920 to perform multiple dot product operations over multiple passes of the datapath 1100 all associated with a single instruction cycle of the datapath 1100. The selection logic 1105 may include a plurality of multiplexors and control logic for switching the multiplexors between the two or more inputs of each multiplexor.

For example, during a first pass, a first input vector $\vec{A}_0$ and a first input vector $\vec{B}_0$ are selected, each input vector having two elements, along with a first element/addend from collector matrix C to generate a first dot product result. During a second pass, the first input vector $\vec{A}_0$ and a second input vector $\vec{B}_1$ are selected along with a second element/addend from collector matrix C to generate a second dot product result. During a third pass, the second input vector $\vec{A}_1$ and the first input vector $\vec{B}_0$ are selected along with a third element/addend from collector matrix C to generate a third dot product result. Finally, during a fourth pass, the second input vector $\vec{A}_1$ and the second input vector $\vec{B}_1$ are selected along with a fourth element/addend from collector matrix C to generate a fourth dot product result. The results may be stored in a result queue 950 having a width of 64 or 128 bits depending on if the dot product results stored in the collector matrix C are encoded as half-precision, floating-point values or single-precision, floating-point values.

In another embodiment, the 4:2 CSA 1142 and 3:2 CSA 1144 may be combined as a 5:2 CSA. While the practical difference between the two embodiments is minimal, because a 4:2 CSA is typically implemented as a tree of 3:2 CSAs, and a 5:2 CSA is also typically implemented as a tree of 3:2 CSAs, there are minor differences in controlling the order of how the five arguments are summed.

In yet another embodiment, the product alignment logic 1130 may be configured to truncate the partial products when shifting the partial products, thereby reducing the size of the CSAs configured to sum the aligned partial products. In order to shift the partial products without truncation, the product alignment logic 1130 needs to output partial products of additional width to the 4:2 CSA 1142. In order to avoid the increase in width of the partial products, the product alignment logic 1130 can shift the partial products at the wider bit width and then truncate to the MSBs prior to transmitting the partial products to the 4:2 CSA 1142. This will lead to a reduction in size of the required CSA used to sum the partial products and addend.

In yet another embodiment, the datapath 1100 may be scaled to generate dot products for vectors of greater than two elements. In general, for a pair of p-element vectors, the datapath 1100 may include p units 1110 for computing p partial products as well as additional combinatorial logic to combine all of the partial products. For example, the logic shown in FIG. 11 may be doubled to generate two portions of a dot product, and then an additional reduction layer of combinatorial logic may be included to combine the sum of two partial products with the sum of two other partial products.

It will be appreciated that the addend for a dot product operation having two input vectors may be provided as input to only one of the units 1110 in the datapath 1100. All other units 1110 of the datapath 1100 should receive a zero constant value as the addend operand for the unit 1110 such that the addend is only added to the dot product result one time.

It will be appreciated that the CSA, completion adder, normalizing logic, and rounding logic of each unit 1110 are not utilized when the datapath 1100 is configured to generate a dot product result using the additional combinatorial logic. However, this logic will be used when the datapath 1100 is configured as a vector machine to generate a vector of FMA results. It will be appreciated that the 4:2 CSA adder 1142, 3:2 CSA adder 1144, completion adder 1150, normalizing logic 1160, and rounding logic 1170 are very similar, although of different precision, than the unused logic in each unit when the datapath 1100 is configured to generate a dot product result. It would be useful to utilize the logic within the units 1110, if possible, to perform some of the same operations as the additional combinatorial logic.

Figure 12:
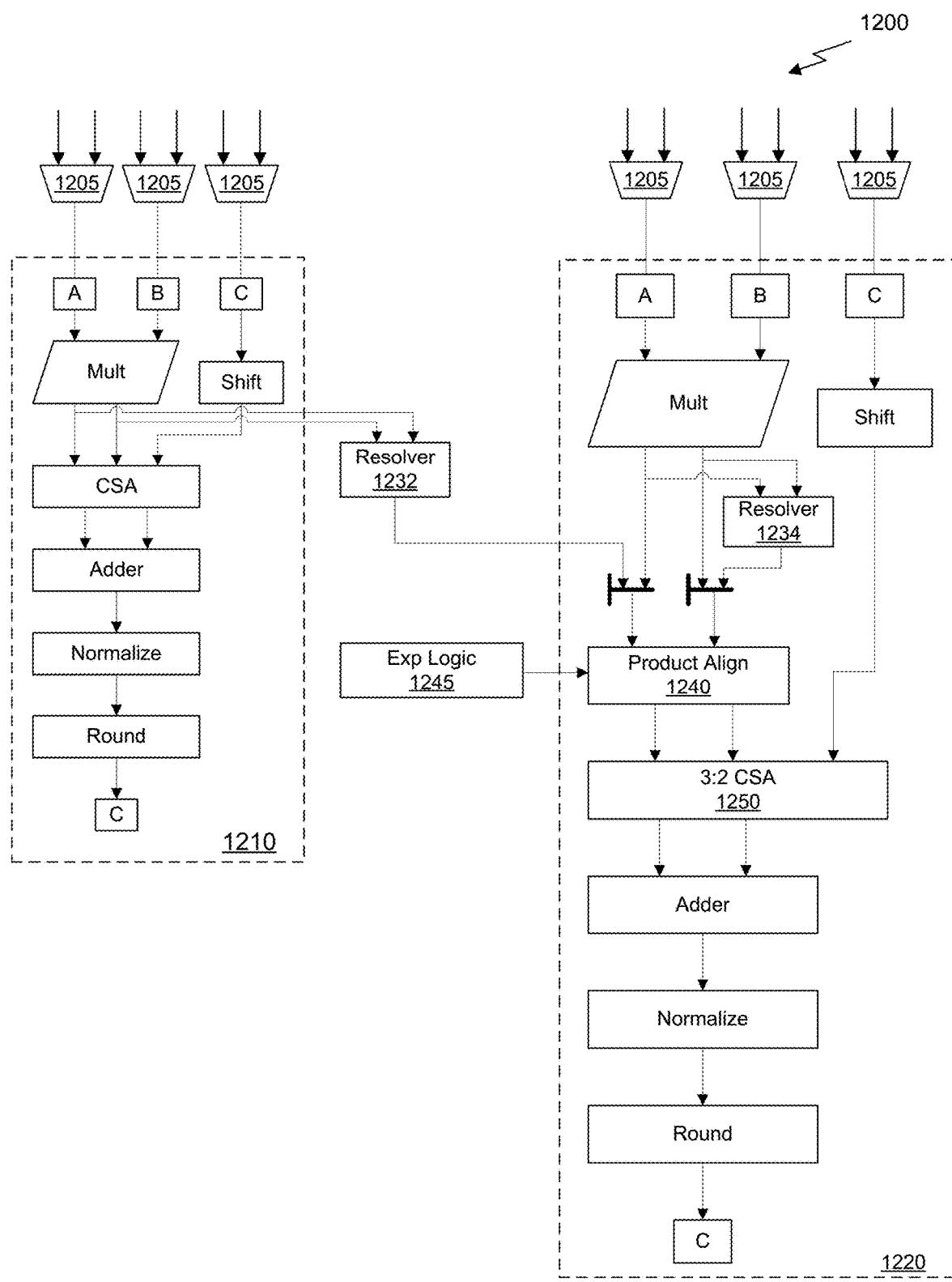
FIG. 12 illustrates an half-precision matrix multiply and accumulate datapath, in accordance with another embodiment.

FIG. 12 illustrates an HMMA datapath 1200, in accordance with another embodiment. The HMMA datapath 1200 includes a "small" half-precision, floating-point FMA unit 1210 and a "large" half-precision, floating-point FMA unit 1220. The small unit 1210 is similar to each of the units 1110 and implements an FMA operation that takes three operands (A, B, and C) as input, multiplies operand A by operand B and sums the product with operand C. The large unit 1220 is similar to the small unit 1210 in that the large unit 1220 implements an FMA operation that takes three operands (A, B, and C) as input, multiplies operand A by operand B and sums the product with operand C. However, the large unit 1220 includes slightly different logic, internally, in order to implement both a half-precision, floating point FMA operation as well as the combinatorial logic in order to implement a dot product operation in combination with the small unit 1210.

As shown in FIG. 12, the partial product generated by the small unit 1210 is output to a first partial product resolver 1232. In one embodiment, the partial product resolver 1232 is a completion adder that combines the two integers generated by the multiplier into a final value that represents the product of the two mantissas of a first partial product. Similarly, the partial product generated by the large unit 1220 is output to a second partial product resolver 1234 that is similar to the first partial product resolver 1232. The output of the first partial product resolver 1232 and a first of the two integers of the second partial product generated by the multiplier in the large unit 1220 are coupled to a first switch, and the output of the second partial product resolver 1234 and a second of the two integers of the second partial product generated by the multiplier in the large unit 1220 are coupled to a second switch. The first and second switch control whether the large unit 1220 is configured in a first mode to generate a result of a scalar FMA operation or whether the large unit 1220 is configured in a second mode to generate a result of a vector dot product operation.

The outputs of the first and second switch are coupled to a product alignment logic 1240 that is configured to, when the large unit 1220 is configured in the second mode, shift the partial products passed as input via the first and second switch. The product alignment logic 1240 is controlled by the exponent comparison logic 1245, which operates similarly to the exponent comparison logic 1120. If the large unit 1220 is configured in the first mode, then the product alignment logic 1240 does not shift either of the two integers passed to the product alignment logic 1240 via the first and second switch. No shifting is performed because the exponents associated with the two partial products are not related when the small unit 1210 and the large unit 1220 are generating separate scalar FMA results as a vector machine.

The aligned partial products are then passed to a 3:2 CSA 1250 that sums the two partial products with an addend from a third input operand. The 3:2 CSA 1250 in the large unit 1220 may be significantly wider (i.e., have a bigger precision) than the corresponding CSA of the small unit 1210. This is necessary to handle extra bits of precision necessary for lossless operation of the partial product resolvers 1232, 1234 as well as the product alignment logic 1240.

In one embodiment, datapath 1200 also includes selection logic 1205 for selecting between multiple combinations of at least two vectors from input matrix A 710 and at least two vectors from input matrix B 720 as well as different elements/addends from collector matrix C 730 in order to generate multiple dot product results in the result queue 950.

Figure 13:
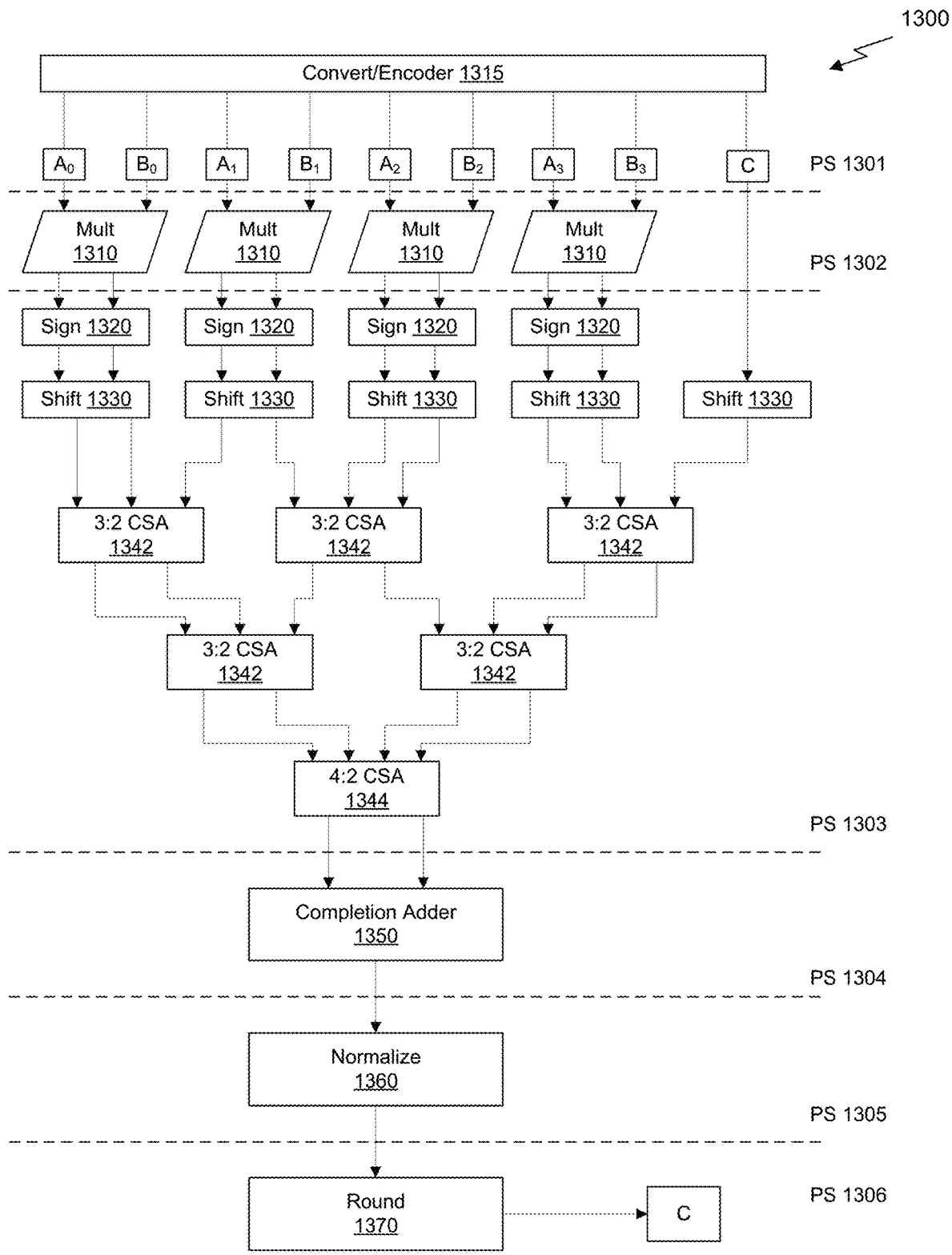
FIG. 13 illustrates an half-precision matrix multiply and accumulate datapath, in accordance with yet another embodiment.

FIG. 13 illustrates an HMMA datapath 1300, in accordance with yet another embodiment. The HMMA datapath 1300 includes four multipliers 1310 for generating partial products of two four-element vectors $\vec{A}$ & $\vec{B}$; four negation logic 1320 blocks for incorporating sign bits of the operands; five shift logic 1330 blocks for shifting the partial products and addend to align all values based on the exponents for the partial products; a CSA tree including a number of reduction layers of 3:2 CSAs 1342 and 4:2 CSAs 1344; a completion adder 1350; normalizing logic 1360; and rounding logic 1370. The datapath 1300 includes a number of pipeline stages: a first pipeline stage 1301 that includes conversion/encoding logic 1315; a second pipeline stage 1302 that includes the multipliers 1310; a third pipeline stage 1303 that includes negation logic 1320, shift logic 1330, and a CSA tree; a fourth pipeline stage 1304 that includes a completion adder; a fifth pipeline stage 1305 that includes normalizing logic 1360; and a sixth pipeline stage 1306 that includes rounding logic 1370.

In the first pipeline stage 1301, the conversion/encoding logic 1315 receives the elements of two input vectors and an element/addend of the collector matrix C 730 and performs one or more pre-processing operations on the elements. The pre-processing may involve converting the elements from one format to the half-precision, floating-point value format. For example, input vectors $\vec{A}$ & $\vec{B}$ can be provided in 16-bit floating-point, 8-bit signed/unsigned integer, 16-bit signed/unsigned integer, 32-bit fixed-point format, etc. The conversion/encoding logic 1315 is configured to convert all input values to a half-precision, floating-point value format for compatibility with the rest of the datapath 1300.

In one embodiment, the conversion/encoding logic 1315 may also include a modified Booth encoder. The modified Booth encoder generates selector signals for each three bits of the multiplicand (e.g., the bits of the elements of the A vector). The selector signals are then passed to a multiplier 1310 that is designed to implement a modified Booth algorithm to generate the partial products. The modified Booth algorithm may speed up the multiplier 1310 by reducing the number of reduction layers (adders) in the multiplier 1310. It will be appreciated that, in some embodiments, the datapaths 1100 and 1200 may also be modified to incorporate the conversion/encoding logic 1315 and multipliers designed to implement the modified Booth algorithm.

In the second pipeline stage 1302, each of the multipliers 1310 receives a corresponding pair of corresponding elements from the two input vectors $\vec{A}$ & $\vec{B}$. For example, a first multiplier 1310 receives elements $\vec{A}_0$ and $\vec{B}_0$; a second multiplier 1310 receives elements $A_1$ and $B_1$; a third multiplier 1310 receives elements $A_2$ and $B_2$; and a fourth multiplier 1310 receives elements $A_3$ and $B_3$. Each of the multipliers 1310 generates two integers that represent the partial product formed by multiplying the elements input to that multiplier 1310.

In the third pipeline stage 1303, the negation logic blocks 1320 combine the sign bits for the elements input to a corresponding multiplier 1310 and negate the partial products via a two's complement operation applied to the pair of integers if the combined sign bits are negative. For example, a negation logic block 1320 may XOR the sign bit from both elements input to the corresponding multiplier 1310. The result of the XOR operation is 1 if the partial product is negative and 0 if the partial product is positive. If the result of the XOR operation is 1, then the two integers from the multiplier 1310 are negated by two-complementing each value (i.e., switching the state of each bit in the value and then adding one to the result). It will be appreciated that, in some embodiments, the negation logic blocks 1320 can be implemented in datapaths 1100 and 1200 in a similar manner in order to deal with the sign bits of the various operands.

The shift logic 1330 blocks shift the partial products based on the exponents associated with all four partial products. Although not shown explicitly, an adder (such as adder 1020) is used to calculate the exponent associated with each partial product by summing the exponent bits included in the elements associated with a corresponding multiplier 1310. The maximum exponent associated with all four partial products as well as the addend is provided to each of the shift logic 1330 blocks. Each shift logic 1330 block then determines how many bits to shift the partial product corresponding with that shift logic 1330 block in order to align the partial product with the maximum exponent for all partial products. One of the shift logic 1330 blocks shifts the addend mantissa as well. It will be appreciated that the maximum possible shift distance, in bits, will increase the required bit width of the partial product integers passed to the CSA tree in order to avoid a loss of precision. In one embodiment, the shift logic 1330 blocks are configured to truncate the aligned partial products in order to reduce the precision of the adders in the CSA tree.

The CSA tree includes a plurality of reduction levels where three or four inputs are summed to generate two outputs, a carry value and a sum value. As shown in FIG. 13, the 4-element dot product operation requires three reduction levels including three 3:2 CSAs 1342 on the first reduction level; two 3:2 CSAs 1342 on the second reduction level; and one 4:2 CSA 1344 on the third reduction level. The output of the 4:2 CSA 1344 on the third reduction level generates a carry value and a sum value for the dot product of the two vectors summed with the addend. In the fourth pipeline stage 1304, the carry value and sum value are passed to a completion adder 1350, which sum the carry value and sum value to generate a mantissa value for the dot product. In a fifth pipeline stage 1305, the result is passed to normalizing logic 1360, which normalizes the mantissa value for the dot product and adjusts the maximum exponent value for the dot product based on the alignment. In a sixth pipeline stage 1306, the normalized mantissa value and exponent value are passed to rounding logic 1370, which rounds the result to the width of the format for elements of the collector matrix C 730 (e.g., either half-precision or single-precision).

Although not shown explicitly, selection logic, similar to selection logic 1105 and 1205, may be coupled to the conversion/encoding logic 1315 such that multiple vectors stored in the operand collectors 920 may be used to generate a dot product results for four-element vectors over two or more passes of the datapath 1300 during a single instruction cycle.

In another embodiment, the logic shown in FIG. 13 may be copied one or more times to produce a plurality of dot product results in parallel using shared elements from the operand collectors 920. For example, the datapath 1300 may include four, four-element dot product logic units matching the logic shown in FIG. 13. All four dot product logic units share the same $\vec{A}$ vector during a particular pass, but are loaded with different $\vec{B}$ vectors to generate four dot product results for different elements of the collector matrix C 730 in parallel. In addition, multiple passes through the datapath 1300 may be used to generate dot product values for different A vectors stored in the operand collectors 920 during a given instruction cycle.

In yet another embodiment, eight, four-element dot product logic units matching the logic shown in FIG. 13 may be included in the datapath, enabling eight dot product values corresponding to two $\vec{A}$ vectors and four $\vec{B}$ vectors to be generated in a single pass. It will be appreciated that any number of copies of the logic shown in FIG. 13 may be implemented in a single datapath 1300 in order to produce a number of separate and distinct dot product values in parallel. Each copy of the logic may then be paired with any two four-element vectors stored in the operand collectors 920 in order to generate a dot product value for those two vectors. Each copy of the logic may also be coupled to selection logic that enables different pairs of vectors stored in the operand collectors during a single instruction cycle to be consumed by that copy of the logic over multiple passes of the datapath.

Figure 14:
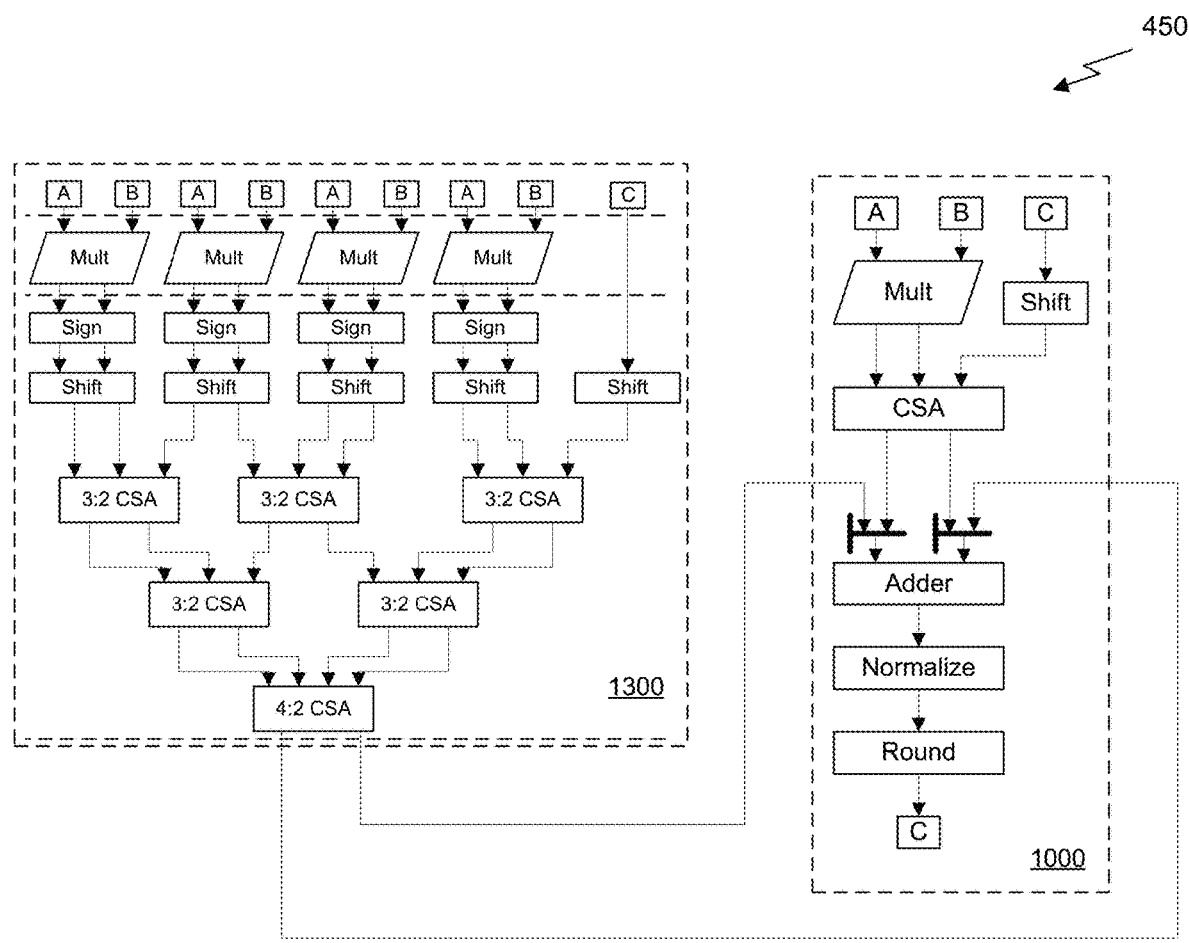
FIG. 14 illustrates the half-precision matrix multiply and accumulate datapath of FIG. 13 configured to share at least one pipeline stage with the double-precision, floating-point fused multiply accumulate datapath of FIG. 10, in accordance with one embodiment.

FIG. 14 illustrates the HMMA datapath 1300 of FIG. 13 configured to share at least one pipeline stage with the double-precision, floating-point FMA datapath of FIG. 10, in accordance with one embodiment. It will be appreciated that the fourth pipeline stage 1304, the fifth pipeline stage 1305, and the sixth pipeline stage 1306 look relatively familiar when analyzing the architecture of datapath 1000, datapath 1100, datapath 1200, and datapath 1300, as described above. Basically, these pipeline stages all include a completion adder, normalizing logic, and rounding logic to convert a carry value and sum value generated for the dot product to fit a particular format of the elements of the collector matrix C 730. The only differences between the logic in each of datapaths 1000, 1100, 1200, and 1300 is the precision of said logic. However, the completion adder 1050 of the double-precision, floating-point FMA datapath 1000 will be larger than the completion adders of HMMA datapaths 1100, 1200, and 1300. Consequently, datapath 1300 can be reduced in size in any architecture where a core includes both the HMMA datapath 1300 and a double-precision, floating-point FMA datapath 1000 coupled to the same operand collectors 920 and results queue 950.

In one embodiment, a core 450 includes both an HMMA datapath 1300 and a double-precision, floating-point FMA datapath 1000. However, the HMMA datapath 1300 is modified to omit the fourth pipeline stage 1304, the fifth pipeline stage 1305, and the sixth pipeline stage 1306. Instead, the output of the third pipeline stage 1303 (i.e., the carry value and sum value that represent the dot product value output by the CSA tree) is routed to a pair of switches included in the FMA datapath 1000. The pair of switches enable the FMA datapath 1000 to use the completion adder to sum either the dot product value from the HMMA datapath 1300 or the FMA result from the FMA datapath 1000. Consequently, the HMMA datapath 1300 shares the pipeline stages of the FMA datapath 1000 that include the completion adder, normalizing logic, and rounding logic. It will be appreciated that, although not shown explicitly, the maximum exponent value associated with the dot product may also be transmitted to a switch in the FMA datapath 1000 so that the normalizing logic can switch between the exponent value generated by adder 1020 and the maximum exponent value associated with the dot product generated by the HMMA datapath 1300.

Sharing the logic between the two datapaths, as well as sharing operand collectors 920 and results queue 950, may significantly reduce a size of the die footprint for the core 450 on the integrated circuit. Consequently, more cores 450 can be designed on a single integrated circuit die.

As the aforementioned illustrates, a variety of datapaths may be designed to implement the MMA operation more efficiently than in current datapath designs such as scalar FMA datapaths and even vector machines that are configured to compute partial products in parallel. One major aspect of the design is that more than a single pair of vectors can be loaded from the register file and coupled to the inputs of the datapath such that multiple dot product values can be generated during a single instruction cycle. As used herein, an instruction cycle refers to all operations related to loading the operand collectors with a plurality of operands from the register file and then executing the MMA operation on the datapath to generate a plurality of dot product values corresponding to different elements of a result matrix before writing the plurality of dot product values to the register file. Each instruction cycle may include a number of passes of the datapath to generate results for different combinations of pair(s) of vectors over multiple passes. Furthermore, each pass may be pipelined such that a second pass is started before a first pass has been completed. An instruction for an MMA operation may be implemented over a number of instruction cycles, loading different portions of the input matrix operands into the operand collectors for the datapath during each instruction cycle. Consequently, an instruction for an MMA operation may include matrix operands of arbitrary size that are processed over multiple instruction cycles and/or on multiple cores applying different vectors from the matrix operands to each datapath during each instruction cycle until all of the vectors from the matrix operands have been processed.

Known applications of the MMA operations include image processing (e.g., performing affine transformations on images), machine learning (e.g., using matrix operations when performing linear algebra, optimizing a function, or calculating statistics), as well as others. Matrix algebra is a foundational field that can be applied extensively in a huge variety of applications. Thus, increasing the processing efficiency of MMA operations by designing processors capable of executing such operations more quickly is of great benefit to the speed and efficiency of computational processing.

More specifically, MMA operations performed with the disclosed datapaths exhibit better numerical behavior and/or offer improved efficiency of the processors that implement the datapaths. For example, parallel accumulation of partial products using a single adder eliminates multiple rounding compared to using serial adders that each perform rounding as part of the accumulate operation. The worst case error bound can be pushed to be one (or a half) unit of the machine precision for any length vector, while serial mul-add-add-add datapaths implemented in conventional dot-product datapaths exhibit worst case error bound that is proportional to the vector length.

Furthermore, the disclosed datapaths exhibit lower latency than prior art datapaths. Fewer pipeline stages require smaller numbers of flip-flops to implement, which improves the power consumption of the datapath. Because the datapath reuses operand vectors, a smaller register file is required to implement the same MMA operation that could be implemented by conventional datapaths operating serially. Further, internal shifter and adder lengths can be reduced to match a desired error bound, thereby reducing the number of flip-flops in the datapath even further. In addition, power can be saved by simply updating some of the matrix operands at the operand collectors at the input of the datapath, chaining dot product operations to generate larger dot product results in the result queue rather than being forced to write intermediate results back to the register file and then re-load the intermediate results from the register file back into the operand collectors at the input of the datapath.

Figure 15:
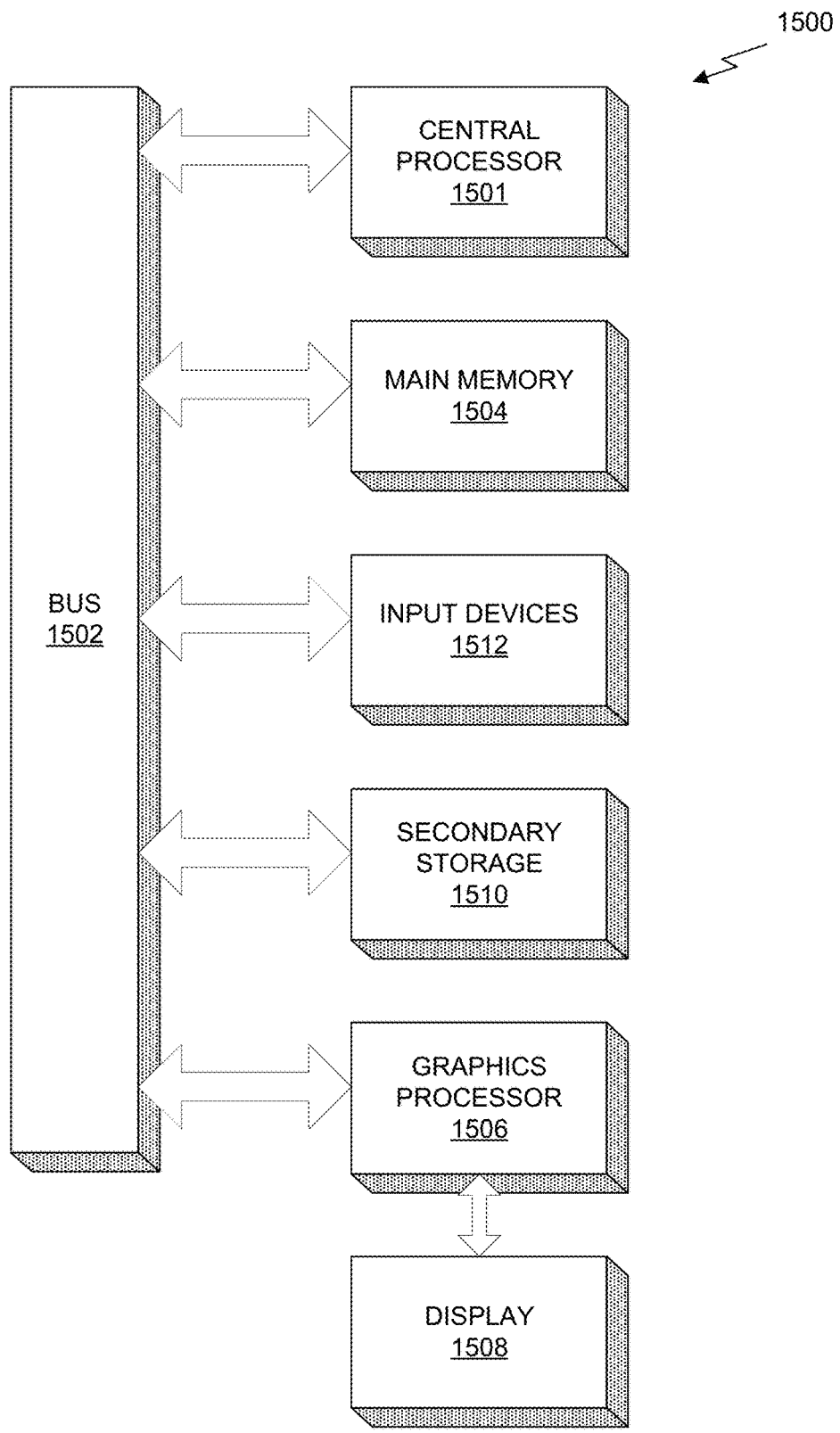
FIG. 15 illustrates an exemplary system in which the various architecture and/or functionality of the various previous embodiments may be implemented.

FIG. 15 illustrates an exemplary system 1500 in which the various architecture and/or functionality of the various previous embodiments may be implemented. As shown, a system 1500 is provided including at least one central processor 1501 that is connected to a communication bus 1502. The communication bus 1502 may be implemented using any suitable protocol, such as PCI (Peripheral Component Interconnect), PCI-Express, AGP (Accelerated Graphics Port), HyperTransport, or any other bus or point-to-point communication protocol(s). The system 1500 also includes a main memory 1504. Control logic (software) and data are stored in the main memory 1504 which may take the form of random access memory (RAM).

The system 1400 also includes input devices 1512, a graphics processor 1506, and a display 1508, i.e. a conventional CRT (cathode ray tube), LCD (liquid crystal display), LED (light emitting diode), plasma display or the like. User input may be received from the input devices 1512, e.g., keyboard, mouse, touchpad, microphone, and the like. In one embodiment, the graphics processor 1506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1500 may also include a secondary storage 1510. The secondary storage 1510 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1504 and/or the secondary storage 1510. Such computer programs, when executed, enable the system 1500 to perform various functions. The memory 1504, the storage 1510, and/or any other storage are possible examples of computer-readable media.

In one embodiment, the architecture and/or functionality of the various previous figures may be implemented in the context of the central processor 1501, the graphics processor 1506, an integrated circuit (not shown) that is capable of at least a portion of the capabilities of both the central processor 1501 and the graphics processor 1506, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1500 may take the form of a desktop computer, laptop computer, server, workstation, game consoles, embedded system, and/or any other type of logic. Still yet, the system 1500 may take the form of various other devices including, but not limited to a personal digital assistant (PDA) device, a mobile phone device, a television, etc.

Further, while not shown, the system 1500 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A multi-threaded processor, comprising:
a decoder to decode a floating point matrix multiply and accumulate (MMA) instruction;
a buffer to store 16-bit floating point matrix data specified by operands of the MMA instruction;
a scheduler to schedule the MMA instruction;
a fused multiply accumulate (FMA) unit to perform a dot product of corresponding pairs of the 16-bit floating point matrix data;
logic to shift a plurality of partial products of the dot product;
an arithmetic logic unit (ALU) to add the plurality of partial products to be accumulated into a register; and
memory to store a result of the MMA instruction.

2. The multi-threaded processor of claim 1, wherein the logic to shift the plurality of partial products of the dot product aligns the plurality of partial products based on exponents associated with each element of the corresponding pairs.

3. The multi-threaded processor of claim 1, further comprising a tree of adders, where the tree of adders comprises at least a 3:2 carry sum adder (CSA).

4. The multi-threaded processor of claim 1, further comprising a dispatch unit to transmit the MMA instruction to the FMA unit.

5. The multi-threaded processor of claim 1, further comprising a register file to provide the register.

6. The multi-threaded processor of claim 1, further comprising a special function unit (SFU).

7. The multi-threaded processor of claim 1, further comprising an interconnect to connect the ALU and the register.

8. A system comprising the multi-threaded processor of claim 1, wherein the system further comprises:
a system bus to connect the multi-threaded processor to one or more peripheral devices; and
one or more dynamic random access memory (DRAM) devices.

9. A single instruction multiple data (SIMD) multi-threaded processor, comprising:
a plurality of cores to perform a floating point matrix multiply and accumulate (MMA) instruction, where each of the plurality of cores comprises:
a front end to fetch the MMA instruction;
an instruction cache to store the MMA instruction;
an L1 cache to store data;
an L2 cache to store data;
a plurality of ports to read from and write to a memory;
one or more load/store units to read and write the memory;
an interconnect to couple the memory and the plurality of cores;
a decoder to decode the MMA instruction;
a buffer to store 16-bit floating point matrix data specified by operands of the MMA instruction;
a scheduler to schedule the MMA instruction;
a fused multiply accumulate (FMA) unit to perform a dot product of corresponding pairs of the 16-bit floating point matrix data;
logic to shift a plurality of partial products of the dot product;
an arithmetic logic unit (ALU) to add the plurality of partial products to be accumulated into a register; and
wherein the memory is to store a result of the MMA instruction.

10. The SIMD multi-threaded processor of claim 9, wherein the L1 cache comprises at least 24 kilobytes (KB) of storage.

11. The SIMD multi-threaded processor of claim 9, wherein the memory comprises at least 64 kilobytes (KB) of storage.

12. The SIMD multi-threaded processor of claim 9, wherein the interconnect connects the one or more load/store units to the register.

13. The SIMD multi-threaded processor of claim 9, wherein the scheduler dispatches the MMA instruction to one or more cores of the plurality of cores.

14. The SIMD multi-threaded processor of claim 9, wherein the logic to shift the plurality of partial products of the dot product aligns the plurality of partial products based on exponents associated with each element of the corresponding pairs.

15. A computer-implemented method, comprising:
decoding, by a decoder, a floating point matrix multiply and accumulate (MMA) instruction;
storing, by a buffer, 16-bit floating point matrix data specified by operands of the MMA instruction;
scheduling, by a scheduler, the MMA instruction;
performing, by a fused multiply accumulate (FMA) unit, a dot product of corresponding pairs of the 16-bit floating point matrix data;
shifting, by logic to shift, a plurality of partial products of the dot product;
adding, by an arithmetic logic unit (ALU), the plurality of partial products to be accumulated into a register; and
storing, by a memory, a result of the MMA instruction.

16. The computer-implemented method of claim 15, wherein the ALU comprises at least one adder.

17. The computer-implemented method of claim 15, wherein shifting the plurality of partial products further comprises aligning the plurality of partial products based on exponents associated with each element of the corresponding pairs.

18. The computer-implemented method of claim 15, wherein the scheduler comprises a dispatch unit to dispatch the MMA instruction.

19. The computer-implemented method of claim 15, further comprising accumulating the plurality of partial products into the register using an interconnect.

20. The computer-implemented method of claim 15, wherein a register file provides the register.

* * * * *